US012105445B2

(12) United States Patent
Sakamaki et al.

(10) Patent No.: US 12,105,445 B2
(45) Date of Patent: Oct. 1, 2024

(54) DEVELOPING DEVICE

(71) Applicant: CANON KABUSHIKI KAISHA, Tokyo (JP)

(72) Inventors: Tomoyuki Sakamaki, Tokyo (JP); Takahiro Suzuki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/237,956

(22) Filed: Aug. 25, 2023

(65) Prior Publication Data

US 2023/0400797 A1 Dec. 14, 2023

Related U.S. Application Data

(62) Division of application No. 17/826,390, filed on May 27, 2022, now Pat. No. 11,782,362.

(30) Foreign Application Priority Data

Jun. 21, 2021 (JP) ................................ 2021-102398

(51) Int. Cl.
*G03G 15/09* (2006.01)
*G03G 15/08* (2006.01)

(52) U.S. Cl.
CPC ..... *G03G 15/0928* (2013.01); *G03G 15/0812* (2013.01)

(58) Field of Classification Search
CPC ........... G03G 15/0921; G03G 15/0812; G03G 15/0928; G03G 15/09
See application file for complete search history.

(56) References Cited

U.S. PATENT DOCUMENTS 5,158,852 A 10/1992 Sakata et al.
5,239,343 A * 8/1993 Sakemi .............. G03G 15/0921 399/275
9,046,824 B2 6/2015 Inaba et al.
(Continued)

FOREIGN PATENT DOCUMENTS

CN 104076659 A 10/2014
CN 109074016 A 12/2018
(Continued)

OTHER PUBLICATIONS

European Search Report dated Apr. 4, 2023, in related European Patent Application No. 22176618.1-1020.
Chinese Office Action dated Apr. 11, 2024, in Chinese Patent Application No. 202210682871.0 (with English translation).

*Primary Examiner* — Jessica L Eley
(74) *Attorney, Agent, or Firm* — VENABLE LLP

(57) ABSTRACT

A developing device includes a developing container, a rotatable developing member to carry and feed the developer to a developing position, a magnet provided non rotatably and stationarily inside the rotatable developing member and provided with a regulating pole, and a regulating portion to regulate an amount of the developer carried on the rotatable developing member by a magnetic force of the regulating pole. With respect to a rotational direction of the rotatable developing member, a local minimum position, where a magnetic flux density of the regulating pole in a normal direction is a local minimum value, is downstream of a first local maximum position where the magnetic flux density of the regulating pole in the normal direction is a first local maximum value, and is upstream of a second local maximum position where the magnetic flux density of the regulating pole is a second local maximum value.

19 Claims, 6 Drawing Sheets

(56) References Cited

U.S. PATENT DOCUMENTS

| | | | | |
|---|---|---|---|---|
| 9,335,666 | B2 | 5/2016 | Sakamaki | |
| 9,442,428 | B2 | 9/2016 | Sakamaki et al. | |
| 10,768,552 | B2 | 9/2020 | Sakamaki et al. | |
| 11,262,672 | B2 | 3/2022 | Sakamaki et al. | |
| 11,556,081 | B2 * | 1/2023 | Takahashi .......... | G03G 15/0921 |
| 11,982,954 | B2 * | 5/2024 | Suzuki ............... | G03G 15/0921 |
| 2004/0234299 | A1 | 11/2004 | Koetsuka et al. | |
| 2015/0253689 | A1 | 9/2015 | Ishida et al. | |
| 2017/0235248 | A1 | 8/2017 | Shima et al. | |
| 2018/0074441 | A1 * | 3/2018 | Okuyama .......... | G03G 15/0921 |
| 2018/0284641 | A1 | 10/2018 | Soeta et al. | |
| 2018/0284655 | A1 | 10/2018 | Hori et al. | |
| 2018/0284656 | A1 | 10/2018 | Takahashi et al. | |
| 2019/0250531 | A1 | 8/2019 | Shigehiro | |

FOREIGN PATENT DOCUMENTS

| | | | |
|---|---|---|---|
| JP | S6259961 | A | 3/1987 |
| JP | S63-197977 | A | 8/1988 |
| JP | H03-139680 | A | 6/1991 |
| JP | H03-163569 | A | 7/1991 |
| JP | H05-11617 | A | 1/1993 |
| JP | 2000-187390 | A | 7/2000 |
| JP | 2001-318534 | A | 11/2001 |
| JP | 2002-108102 | A | 4/2002 |
| JP | 2002-108103 | A | 4/2002 |
| JP | 2005-115115 | A | 4/2005 |
| JP | 2018-045224 | A | 3/2018 |
| JP | 2018-169566 | A | 11/2018 |
| JP | 2019-003080 | A | 1/2019 |

* cited by examiner

DEVELOPING DEVICE

This application is a divisional of application Ser. No. 17/826,390, filed May 27, 2022.

FIELD OF THE INVENTION AND RELATED ART

The present invention relates to a developing device for use in an image forming apparatus such as a copying machine, a printer, a facsimile machine, and a multi-function machine having a plurality of functions of these machines.

In the developing device, conventionally, one using a two-component developer containing toner comprising non-magnetic particles and a carrier comprising magnetic particles (hereinafter, the two-component developer is simply referred to as the developer) has been known. In such a developing device, the developer is carried on a surface of a developing sleeve (developer carrying member) in which a magnet roller is provided and is fed by rotation of the developing sleeve. The developer is regulated in developer amount (layer thickness) by a regulating member provided closed to the developing sleeve, and then is fed to a developing region opposing a photosensitive drum (image bearing member). Then, an electrostatic latent image formed on the photosensitive drum is developed with the toner in the developer.

In the case of such a constitution, when a positional relationship between a magnetic flux density distribution of the magnet roller and the regulating member is deviated, an amount of the developer regulated by the regulating member and fed to a developing portion changes. In U.S. Patent Publication No. US2017/0235248, a constitution in which a magnetic flux density distribution such that a magnetic flux density Br of a regulating pole, of a plurality of magnetic poles of a magnet roller, in a normal direction relative to the regulating pole opposing a regulating member having two maximum values (peaks) is formed and in which the regulating member is provided opposed to a position between two positions is disclosed.

In the case of the constitution of US 2017/0235248, the magnetic flux density Br of the regulating pole in the normal direction having the magnetic flux density distribution including the two maximum values (peaks) can be made moderate with respect to a rotational direction (θ direction) of a developing sleeve. For this reason, even when the positional relationship between the magnetic flux density distribution of the magnet roller and the regulating member is deviated, a fluctuation in amount of the developer (developer coating) regulated by the regulating member and fed to the developing portion can be suppressed.

Here, in general, a magnetic attraction force Fr in a developing sleeve center direction induced in the carrier by the magnetic flux density is liable to become large in the case where the magnetic flux density is large not only in absolute value but also in change. In the case where the magnetic flux density distribution in which the regulating magnetic pole has the two peaks is employed as in the developing device disclosed in US2017/0235248, in the neighborhood of the two peaks, the absolute value of the magnetic flux density is liable to become large and the change of the magnetic flux density is also liable to become large, and therefore, the magnetic attraction force of the carrier is liable to become large. Particularly, when the magnetic attraction force of the carrier increases a side upstream of the regulating member with respect to a developing sleeve rotational direction, the developer is liable to stagnate at a developer stagnation portion formed upstream of the regulating member. When the developer stagnation occurs, there is a liability that a torque increases and thus developer deterioration (toner deterioration) is liable to occur. In a trend of a low melting point of the toner with speed-up of the image forming apparatus in recent years, it is desired to provide a new constitution capable of suppressing such developer deterioration.

SUMMARY OF THE INVENTION

A principal object of the present invention is to provide a developing device capable of compatibly realizing stabilization of a developer coating amount in a constitution in which a magnetic flux density of a regulating magnetic pole in a normal direction has two maximum values and suppression of toner deterioration.

According to an aspect of the present invention, there is provided a developing device comprising: a developing container configured to contain a developer containing toner and a carrier; a rotatable developing member configured to carry and feed the developer to a developing position; a magnet provided non-rotatably and stationarily inside the rotatable developing member and provided with a regulating pole; and a regulating portion configured to regulate an amount of the developer carried on the rotatable developing member by a magnetic force of the regulating pole, wherein with respect to a rotational direction of the rotatable developing member, a minimum position where a magnetic flux density of the regulating pole in a normal direction relative to an outer peripheral surface of the rotatable developing member is a minimum value is downstream of a first maximum position where the magnetic flux density of the regulating pole in the normal direction relative to the outer peripheral surface of the rotatable developing member is a first maximum value, and is upstream of a second maximum position where the magnetic flux density of the regulating pole in the normal direction relative to the outer peripheral surface of the rotatable developing member is a second maximum value, wherein with respect to the rotational direction of the rotatable developing member, an angle between the first maximum position and the second maximum position is 20° or more and less than 50°, wherein with respect to the rotational direction of the rotatable developing member, an opposing position where the regulating portion is opposed to the outer peripheral surface of the rotatable developing member is downstream of the first maximum position and is upstream of the second maximum position, wherein an absolute value of the first maximum value is smaller than an absolute value of the second maximum value, and wherein with respect to the rotational direction of the rotatable developing member, an angle from the second maximum position to a position where the magnetic flux density of the regulating pole in the normal relative to the outer peripheral surface of the rotatable developing member is a half value of the second maximum value on a side downstream of the second maximum position is smaller than an angle from a position where the magnetic flux density of the regulating pole in the normal direction relative to the outer peripheral surface of the rotatable developing member is a half value of the first maximum value on a side upstream of the first maximum position to the first maximum value.

According to another aspect of the present invention, there is provided a developing device comprising: a developing container configured to contain a developer containing toner and a carrier; a rotatable developing member configured to carry and feed the developer to a developing position; a magnet provided non-rotatably and stationarily inside the rotatable developing member and provided with a regulating pole; and a regulating portion configured to regulate an amount of the developer carried on the rotatable developing member by a magnetic force of the regulating pole, wherein with respect to a rotational direction of the rotatable developing member, a minimum position where a magnetic flux density of the regulating pole in a normal direction relative to an outer peripheral surface of the rotatable developing member is a minimum value is downstream of a first maximum position where the magnetic flux density of the regulating pole in the normal direction relative to the outer peripheral surface of the rotatable developing member is a first maximum value, and is upstream of a second maximum position where the magnetic flux density of the regulating pole in the normal direction relative to the outer peripheral surface of the rotatable developing member is a second maximum value, wherein with respect to the rotational direction of the rotatable developing member, an angle between the first maximum position and the second maximum position is 20° or more and less than 50°, wherein with respect to the rotational direction of the rotatable developing member, an opposing position where the regulating portion is opposed to the outer peripheral surface of the rotatable developing member is downstream of the first maximum position and is upstream of the second maximum position, wherein an absolute value of the first maximum value is smaller than an absolute value of the second maximum value, and wherein the following relationship is satisfied:

$$B1/\theta 1 < B2/\theta 2,$$

where B1 represents an absolute value of the first maximum value, B2 represents an absolute value of the second maximum value, θ1 represents an angle from a position where the magnetic flux density of the regulating pole in the normal direction relative to the outer peripheral surface of the rotatable developing member is a half value of the first maximum value on a side upstream of the first maximum position to the first maximum position with respect to the rotational direction of the rotatable developing member, and θ2 represents an angle from the second maximum position to a position where the magnetic flux density of the regulating pole in the normal direction relative to the outer peripheral surface of the rotatable developing member is a half value of the second maximum position on a side downstream of the second maximum position with respect to the rotational direction of the rotatable developing member.

According to another aspect of the present invention, there is provided a developing device comprising: a developing container configured to contain a developer containing toner and a carrier; a rotatable developing member configured to carry and feed the developer to a developing position; a magnet provided non-rotatably and stationarily inside the rotatable developing member and provided with a regulating pole, an upstream-side magnetic pole provided adjacent to the regulating pole on a side upstream of the regulating pole with respect to a rotational direction of the rotatable developing member, and a downstream-side magnetic pole provided adjacent to the regulating pole on a side downstream of the regulating pole with respect to the rotational direction of the rotatable developing member; and a regulating portion configured to regulate an amount of the developer carried on the rotatable developing member by a magnetic force of the regulating pole, wherein with respect to the rotational direction of the rotatable developing member, a minimum position where a magnetic flux density of the regulating pole in a normal direction relative to an outer peripheral surface of the rotatable developing member is a minimum value is downstream of a first maximum position where the magnetic flux density of the regulating pole in the normal direction relative to the outer peripheral surface of the rotatable developing member is a first maximum value, and is upstream of a second maximum position where the magnetic flux density of the regulating pole in the normal direction relative to the outer peripheral surface of the rotatable developing member is a second maximum value, wherein with respect to the rotational direction of the rotatable developing member, an angle between the first maximum position and the second maximum position is 20° or more and less than 50°, wherein with respect to the rotational direction of the rotatable developing member, an opposing position where the regulating portion is opposed to the outer peripheral surface of the rotatable developing member is downstream of the first maximum position and is upstream of the second maximum position, wherein an absolute value of the first maximum value is smaller than an absolute value of the second maximum value, and wherein with respect to the rotational direction of the rotatable developing member, an angle from the second maximum position to a position where the magnetic flux density of the downstream-side regulating pole in the normal relative to the outer peripheral surface of the rotatable developing member is a maximum value is smaller than an angle from a position where the magnetic flux density of the upstream-side regulating pole in the normal direction relative to the outer peripheral surface of the rotatable developing member is a maximum value to the first maximum value.

According to a further aspect of the present invention, there is provided a developing device comprising: a developing container configured to contain a developer containing toner and a carrier; a rotatable developing member configured to carry and feed the developer to a developing position; a magnet provided non-rotatably and stationarily inside the rotatable developing member and provided with a regulating pole; and a regulating portion configured to regulate an amount of the developer carried on the rotatable developing member by a magnetic force of the regulating pole, wherein with respect to a rotational direction of the rotatable developing member, a minimum position where a magnetic flux density of the regulating pole in a normal direction relative to an outer peripheral surface of the rotatable developing member is a minimum value is downstream of a first maximum position where the magnetic flux density of the regulating pole in the normal direction relative to the outer peripheral surface of the rotatable developing member is a first maximum value, and is upstream of a second maximum position where the magnetic flux density of the regulating pole in the normal direction relative to the outer peripheral surface of the rotatable developing member is a second maximum value, wherein with respect to the rotational direction of the rotatable developing member, an angle between the first maximum position and the second maximum position is 20° or more and less than 50°, wherein with respect to the rotational direction of the rotatable developing member, an opposing position where the regulating portion is opposed to the outer peripheral surface of the rotatable developing member is downstream of the first maximum position and is upstream of the second maximum position, and wherein with respect to the rotational direction of the rotatable developing member, an angle from the second maximum position to a position where the magnetic flux density of the regulating pole in the normal relative to the outer peripheral surface of the rotatable developing member is a half value of the second maximum value on a side downstream of the second maximum position is smaller than an angle from a position where the magnetic flux density of the regulating pole in the normal direction relative to the outer peripheral surface of the rotatable developing member is a half value of the first maximum value on a side upstream of the first maximum position to the first maximum position.

Further features of the present invention will become apparent from the following description of exemplary embodiments with reference to the attached drawings.

DESCRIPTION OF THE EMBODIMENTS

First Embodiment

A first embodiment will be described using FIGS. 1 to 5. Incidentally, in this embodiment, the case where a developing device is applied to a full-color printer of a tandem type as an example of an image forming apparatus is described.

[Image Forming Apparatus]

First, a schematic structure of an image forming apparatus 1 will be described using FIG. 1.

In this embodiment, the image forming apparatus 1 is of a type in which an intermediary transfer belt 44*b* is provided and toner images of respective colors are primary-transferred from photosensitive drums 81*y* to 81*k* onto the intermediary transfer belt 44*b* and thereafter composite toner images of the respective colors are secondary-transferred altogether from the intermediary transfer belt 44*b* onto a sheet S. However, the image forming apparatus is not limited thereto, but may also employ a type in which a toner image is directly transferred from a photosensitive drum onto a sheet fed by a sheet feeding belt.

Further, in this embodiment, as a developer, a two-component developer which is a mixture of non-magnetic toner and a magnetic carrier is used. The toner incorporates colorant, a wax component and the like in a resin material such as polyester or styrene, and is formed by pulverization or polymerization. The carrier is formed by subjecting a surface layer of a core consisting of resin particles, with which ferrite particles or magnetic powder is kneaded, to resin coating.

Figure 1:
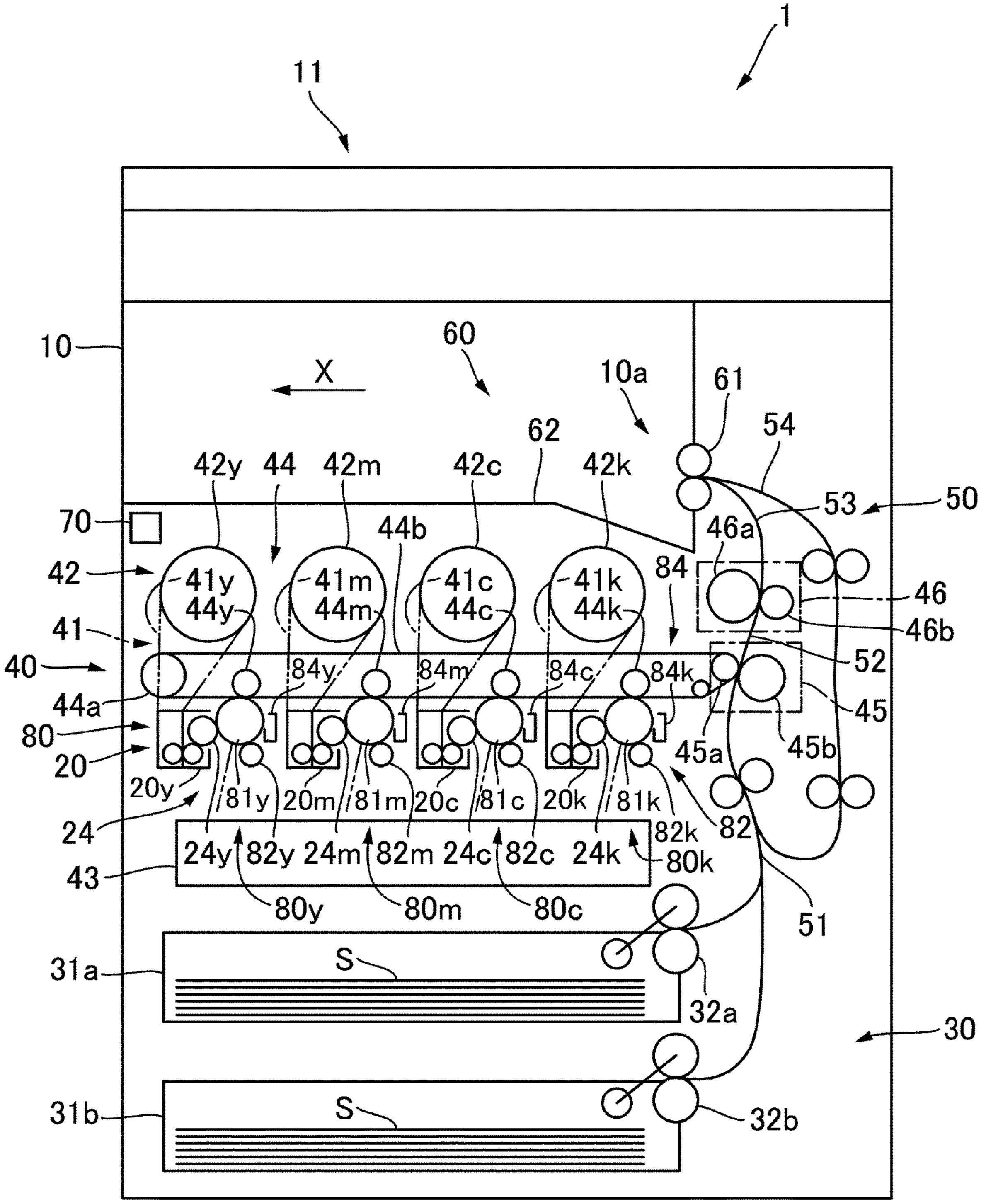
FIG. 1 is a schematic structural sectional view of an image forming apparatus according to a first embodiment.

As shown in FIG. 1, the image forming apparatus 1 includes an image forming apparatus main assembly (hereinafter, referred to as an apparatus main assembly) 10 as a casing. The apparatus main assembly 10 includes an image reading portion 11, a sheet feeding portion 30, an image forming portion 40, a sheet feeding (conveying) portion 50, a sheet discharging portion 60, and a controller 70. On the sheet S as a recording material, the toner image is to be formed, and specific examples of the sheet S may include plain paper, a resin-made material sheet as a substitute for the plain paper, thick paper, a sheet for an overhead projector, and the like.

The image reading portion 11 is provided at an upper portion of the apparatus main assembly 10. The image reading portion 11 includes an unshown platen glass as an original mounting table, an unshown light source for irradiating an original, placed on the platen glass, with light, and an unshown image sensor for converting reflected light into a digital signal, and the like member.

The sheet feeding portion 30 is disposed at a lower portion of the apparatus main assembly 10, and includes sheet cassettes 31*a* and 31*b* for stacking and accommodating the sheets S such as recording paper and includes feeding rollers 32*a* and 32*b*, and feeds the accommodated sheet S to the image forming portion 40.

The image forming portion 40 includes image forming units 80, toner hoppers 41, toner containers 42, a laser scanner 43, an intermediary transfer unit 44, a secondary transfer portion 45 and a fixing device 46. The image forming portion 40 is capable of forming an image on the sheet S on the basis of image information.

Incidentally, the image forming apparatus 1 in this embodiment meets full-color image formation, and the image forming units 80*y*, 80*m*, 80*c*, 80*k* have similar constitutions for four colors of yellow (y), magenta (m), cyan (c), black (k), respectively, and are separately provided. Also the toner hoppers 41*y*, 41*m*, 41*c*, 41*k* and the toner containers 42*y*, 42*m*, 42*c*, 42*k* similarly have the same constitution for the four colors of yellow (y), magenta (m), cyan (c), black (k), respectively, and are separately provided. For this reason, in FIG. 1, respective constituent elements for the four colors are represented by identifiers for the colors, but in FIG. 2 and in the specification, are described using only reference numerals or symbols without adding the identifiers for the colors in some cases.

The toner containers 42 are, for example, cylindrical bottles, and the toners are accommodated, and above the respective image forming unit 80, the toner container 42 is connected and disposed through the toner hopper 41. The laser scanner 43 exposes the surface of the photosensitive drum 81, electrically charged by the charging roller 82, to light and thus an electrostatic latent image is formed on the surface of the photosensitive drum 81.

The image forming unit 80 includes the four image forming units 80*y*, 80*c*, 80*k* for forming toner images of the four colors. The image forming units 80*y*, 80*m*, 80*c*, 80*k* include the photosensitive drums (image bearing member) 81*y*, 81*m*, 81*c*, 81*k* for forming the toner image, the charging rollers 82*y*, 82*m*, 82*c*, 82*k*, a developing devices 20*y*, 20*m*, 20*c*, 20*k*, and cleaning blades 84*y*, 84*m*, 84*c*, 84*k*. Further, the photosensitive drums 81*y*, 81*m*, 81*c*, 81*k*, the charging roller 82y, 82m, 82c, 82k, the developing devices 20y, 20m, 20c, 20k, the cleaning blades 84y, 84m, 84c, 84k, and developing sleeves 24 described later have the same constitution for the four colors of yellow (y), magenta (m), cyan (c), black (k), respectively, and are separately provided. For this reason, in FIG. 1, respective constituent elements for the four colors are represented by identifiers for the colors, but in FIG. 2 and in the specification, are described using only reference numerals or symbols without adding the identifiers for the colors in some cases.

The photosensitive drum 81 as the image bearing member includes a photosensitive layer formed on an outer peripheral surface of an aluminum cylinder so as to have a negative charge polarity, and is rotated in an arrow direction at a predetermined process speed (peripheral speed). The charging roller 82 as a charging member contacts the surface of the photosensitive drum 81 and electrically charges the surface of the photosensitive drum 81 to, e.g., a uniform negative dark-portion potential. After the charging, at each of the respective surfaces of the photosensitive drums 81, an electrostatic latent image is formed on the basis of image information by the laser scanner 43 as an exposure device. Each of the photosensitive drums 81 carries the formed electrostatic image and is circulated and moved, and the electrostatic latent image is developed with the toner by the developing device 20. Details of a structure of the developing device 20 will be described later.

The toner image obtained by developing the electrostatic image is primary-transferred onto the intermediary transfer belt 44b described later. The surface of the photosensitive drum 81 after the primary transfer is discharged by an unshown pre-exposure portion. The cleaning blade 84 as a cleaning member is disposed in contact with the surface of the photosensitive drum 81 and removes a residual matter such as transfer residual toner remaining on the surface of the photosensitive drum 81 after the primary transfer.

The intermediary transfer unit 44 is disposed above the image forming units 80y, 80m, 80c and 80k. The intermediary transfer unit 44 includes a plurality of rollers (stretching members) such as a driving roller 44a, a follower roller 44d, primary transfer rollers 44y, 44m, 44c and 44k, and the intermediary transfer belt 44b as an intermediary transfer member wound around these rollers. The primary transfer rollers 44y, 44m, 44c and 44k are disposed opposed to the photosensitive drums 81, 81m, 81c and 81k, respectively, and are disposed in contact with the intermediary transfer belt 44b.

A positive-polarity transfer bias is applied to the intermediary transfer belt 44b by the primary transfer rollers 44y, 44m, 44c and 44k, whereby toner images having the negative polarity are superposedly transferred successively from the photosensitive drums 81y, 81m, 81c and 81k onto the intermediary transfer belt 44b. By this, the intermediary transfer 44b is circulated and moved in a state in which a full-color image is formed on an outer peripheral surface thereof.

The secondary transfer portion 45 includes a secondary transfer inner roller 45a and a secondary transfer outer roller 45b. By applying a positive-polarity secondary transfer bias to the secondary transfer outer roller 45b, the full-color image formed on the intermediary transfer belt 44b is transferred onto the sheet S. The fixing device 46 includes a fixing roller 46a and a pressing roller 46a. The sheet S is nipped and fed between the fixing roller 46a and the pressing roller 46b, so that the toner image transferred on the sheet S is heated and pressed and thus is fixed on the sheet S.

The sheet feeding portion 50 includes a pre-secondary transfer feeding path 51, a pre-fixing feeding path 52, a discharging path 53, a re-feeding path 54, and feeds the sheet S, fed from the sheet feeding portion 30, from the image forming portion 40 to the sheet discharging portion 60.

The sheet discharging portion 60 includes a discharging roller pair 61 provided in a downstream side of the discharging path 53, and a discharge tray 62 provided on a side downstream of the discharging roller pair 61. The discharging roller pair 61 feeds the sheet S fed from the discharging path 53 through a nip thereof, and discharges the sheet S through a discharge opening 10a formed on the apparatus main assembly 10. The discharge tray 62 is a face-down tray, and the sheet S discharged through the discharge opening 10a in an arrow X direction is stacked on the discharge tray 62.

The controller 70 is constituted by a computer and, e.g., includes a CPU, an ROM for storing a program for controlling respective portions, an RAM for temporarily storing data, and an input-and-output circuit for inputting and outputting signals relative to an external device. The CPU is a microprocessor for effecting entire control of the image forming apparatus 1 and is a principal part of a system controller. The CPU is connected via the input-and-output circuit with each of the image recording portion 11, the sheet feeding portion 30, the image forming portion 40, the sheet feeding portion 50, the sheet discharging portion 60 and an operating portion, and transfers signals with the respective portions and controls operations of the respective portions.

Next, an image forming operation in the image forming apparatus 1 constituted as described above will be described.

When the image forming operation is started, first, the photosensitive drum 81 is rotated, and the surface thereof is electrically charged by the charging roller 82. Then, the laser scanner 43 emits, on the basis of image information, laser light toward the surface of the photosensitive drum 81, so that the electrostatic latent image is formed on the surface of the photosensitive drum 81. The toner is deposited on the electrostatic latent image, so that the electrostatic latent image is developed (visualize) into a toner image, and then the toner image is transferred onto the intermediary transfer belt 44b.

On the other hand, in parallel to such a toner image forming operation, the feeding rollers 32a and 32b are rotated and feed the uppermost sheet S in the sheet cassettes 31a and 31b while separating the sheet S. Then, the sheet S is fed to the secondary transfer portion 45 via the pre-secondary transfer feeding path 51 by being timed to the toner image on the intermediary transfer belt 44b. Then, the toner image is transferred from the intermediary transfer belt 44b onto the sheet S, and the sheet S is fed into the fixing device 46, in which the unfixed toner image is heated and pressed, thus is fixed on the surface of the sheet S. The sheet S is discharged through the discharge opening 10a by the discharging roller pair 61, and is stacked on the discharge tray 62.

[Developing Device]

Figure 2:
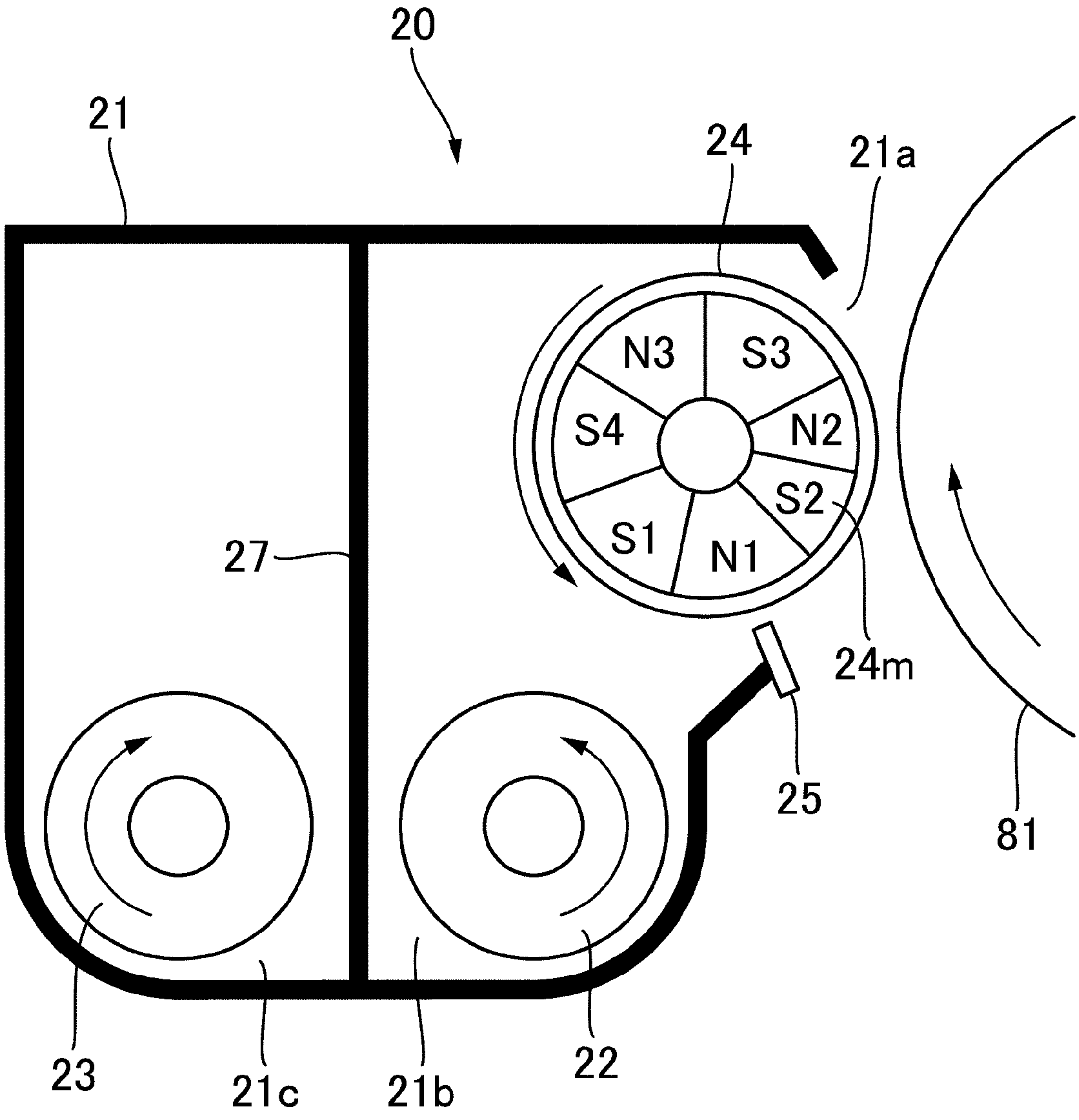
FIG. 2 is a schematic structural sectional view of a developing device according to the first embodiment.

Next, the developing device 20 will be specifically described with reference to FIG. 2. The developing device 20 includes a developing (developer) container 21 accommodating the developer, a first screw 22 and a second feeding screw 23, the developing sleeve 24, and a regulating member (regulating blade in this embodiment) 25. The developing container 21 is provided with an opening 21a where the developing sleeve 24 is exposed at a position opposing the photosensitive drum 81.

Into the developing container 21, the toner is supplied from the toner container 42 (FIG. 1) in which the toner is filled. The developing container 21 includes a partition wall 27 extending in a longitudinal direction substantially at a central portion. The developing container 21 is partitioned by the partition wall 27 into a developing chamber 21*b* and a stirring chamber 21*c* with respect to a horizontal direction. The developer is accommodated in the developing chamber 21*b* and the stirring chamber 21*c*. In the developing chamber 21*b*, the developer is fed to the developing sleeve 24. The stirring chamber 21*c* communicates with the developing chamber 21*b*, and the developer is collected from the developing sleeve 24 and is stirred.

The first feeding screw 22 is disposed in the developing chamber 21*b* along an axial direction of the developing sleeve 24 and in substantially in parallel with the developing sleeve 24. The second feeding screw 23 is disposed in the stirring chamber 21*c* in substantially in parallel with a shaft of the first feeding screw 22, and feeds the developer in the stirring chamber 21*c* in a direction opposite to a feeding direction of the first feeding screw 22. That is, the developing chamber 21*b* and the stirring chamber 21*c* constitute a circulation path of the developer along which the developer is fed while being stirred. The toner is triboelectrically charged to the negative polarity through sliding with the carrier by being stirred by the respective screws 22 and 23.

The developer in the developing container 21 is carried on the developing sleeve 24 by a magnet roller 24*m* fixedly provided inside the rotatable developing sleeve 24. Thereafter, the developer on the developing sleeve 24 is regulated in developer amount (layer thickness) by the regulating member 25, and is fed to a developing region opposing the photosensitive drum 81 by rotation of the developing sleeve 24. The developer is contacted to the photosensitive drum 81, whereby the toner is supplied to the photosensitive drum 81, so that the electrostatic latent image on the photosensitive drum 81 is developed as the toner image. At this time, between the photosensitive drum 81 and the developing sleeve 24, a developing bias in a superimposed form including a DC voltage and an AC voltage is applied so that the toner jumps to the electrostatic latent image.

The developing sleeve 24 as a developer carrying member carries the developer including the non-magnetic toner and the magnetic carrier and rotationally feeds the developer to the developing region opposing the photosensitive drum 81. The developing sleeve 25 is 20 mm in diameter, for example, and has a cylindrical shape, and is constituted by a non-magnetic material such as aluminum or non-magnetic stainless steel, and is formed in this embodiment by aluminum.

The regulating member 25 opposes a regulating magnetic pole N1 of the magnet roller 24*m* and is provided on the developing container 21. Further, the regulating member 25 includes a developing portion which is provided opposed to an and in non-contact with the developing sleeve 24 and which is for regulating an amount of the developer carried on the developing sleeve 24. That is, the regulating member 25 is fixed to the developing container 21 in a state in which a free end (regulating portion) thereof is spaced from the developing sleeve 24 with a predetermined interval, and regulates a layer thickness of the developer by cutting of the magnetic chain of the developer carried on the surface of the developing sleeve 24 by a magnetic force (magnetic attraction force) of the regulating magnetic pole N1. Such a regulating member 25 is consisting of a metal plate (for example, an SUS plate) disposed along a longitudinal direction of the developing sleeve 24, and passes through between the free end (regulating portion) of the regulating member 25 and the developing sleeve 24 and is sent to the developing region Da. Incidentally, the regulating member 25 may be either of a magnetic member or a non-magnetic member, but may preferably be the magnetic member from the following viewpoint. In the case of the magnetic member, a magnetic field is formed between the free end (magnet portion) of the regulating member 25 and the developing sleeve 24, and the magnetic attraction force acts on the surface of the regulating member 25. As a result, the developer is easily cut. Further, there is an advantage such that an interval between the free end (regulating portion) of the regulating member 25 and the developing sleeve 24 can be made large, and thus a foreign matter is not readily clogged.

On the other hand, in the case of the magnetic member, there is a liability that the developer is constrained by the magnetic field between the free end portion of the regulating member 25 and the positive 24 and thus a developer deterioration due to friction is liable to occur. Incidentally, the regulating member 25 may also be a regulating member in which a magnetic member is applied to a part of the non-magnetic member. By doing so, the advantage of the magnetic member is somewhat lost, but it is possible to suppress the developer deterioration. In this embodiment, as the regulating member 25, a regulating member consisting only of the magnetic member was used. For that reason, there is a liability that the developer is deteriorated, but by using the magnet roller 24*m* in combination, it becomes possible to suppress a deterioration of the developer.

Inside the developing sleeve 24, a roller-shaped magnet roller (magnetic field generating means, magnet) 24*m* is fixedly provided to the developing container 21 in a non-rotatable state. The magnet roller 24*m* includes a plurality of magnetic poles and generates a magnetic field for carrying the developer on the developing sleeve 24. The magnet roller 24*m* includes seven magnetic pieces each having a surface opposing the developing sleeve 24, consisting of a scooping magnetic pole S1, a regulating magnetic pole N1, a feeding magnetic pole S2, a developing magnetic pole N2, a feeding magnetic pole S3, a feeding magnetic pole N3, and a peeling magnetic pole S4. Incidentally, in this embodiment, the magnet roller consisting of the seven (magnetic poles is used, but the magnet roller may also include poles other than the seven poles. For example, a magnet roller consisting of five poles may be used.

However, as in this embodiment, in the case where the magnet roller 24*m* includes seven or more magnetic poles, each of the magnet pieces is liable to become small, so that the influence of a positional deviation of the regulating member on the regulating magnetic pole is liable to occur. For that reason, as in this embodiment, in the case where the magnet roller 24*m* includes the seven or more magnetic poles, an effect of employment of a constitution as described later becomes higher.

The scooping magnetic pole S1 is disposed opposed to the developing chamber 21*b*. The developing magnetic pole N1 is disposed opposed to the regulating member 25. The feeding magnetic pole S2 is disposed on a side upstream of the developing region with respect to a rotational direction. The developing magnetic pole N2 is disposed opposed to the developing region. The feeding magnetic pole S3 and the feeding magnetic pole N3 are disposed on a side downstream of the developing region Da with respect to the rotational direction. The peeling magnetic pole S3 is disposed adjacent to and upstream of the scooping magnetic pole S1 with respect to the rotational direction. Particularly, the regulating magnetic pole N1 as a first magnetic pole is disposed closest to the regulating member 25. Further, with respect to the rotational direction of the developing sleeve 24, the scooping magnetic pole S1 as a second magnetic pole (upstream-side magnetic pole) is disposed adjacent to the regulating magnetic pole N1 on a side upstream of the regulating magnetic pole N1. Further, with respect to the rotational direction of the developing sleeve 24, the feeding magnetic pole S2 as a third magnetic pole (downstream-side magnetic pole) is disposed adjacent to the regulating magnetic pole N1 on a side downstream of the regulating magnetic pole N1.

Next, an operation of the developing sleeve in this embodiment will be described on the basis of FIG. 2. The developing sleeve 24 rotates in an arrow direction, and the developer accommodated in the developing chamber 21*b* is attracted by the scooping magnetic pole S1 opposing the developing chamber 21*b* and is fed toward the regulating member 25. The developer is erected by the regulating magnetic pole N1 opposing the regulating member 25, and a layer thickness thereof is regulated by the regulating member 25 and passes through a gap (spacing) between the developing sleeve 24 and the regulating member 25, so that a developer layer having a predetermined layer thickness is formed on the developing sleeve 24.

The developer layer passes through the feeding magnetic pole S2, and is carried and fed to the developing region opposing the photosensitive drum 81 and then develops the electrostatic latent image, formed on the surface of the photosensitive drum 81, in a state in which the magnetic chains are formed by the developing magnetic pole N2 opposing the developing region.

The developer after being subjected to the development (of the electrostatic latent image) passes through the feeding magnetic poles S3 and N3 disposed downstream of the developing region with respect to the rotational direction and is peeled off of the developing sleeve 24 in a peeling region formed by repulsion of the peeling magnetic pole S4 and the scooping magnetic pole S1. The peeled developer is stirred and fed in the stirring chamber 21*c* and then is supplied again from the developing chamber 21*b* to the developing sleeve 24.

[Magnetic Flux Density Distribution Around Regulating Magnetic Pole]

Next, a magnetic flux density distribution around the regulating magnetic pole N1 of the magnet roller 24*m* in this embodiment will be described. The magnet roller 24*m* has a magnetic flux density distribution such that in the regulating magnetic pole N1 as the first magnetic pole, the magnetic flux density Br of the developing sleeve 24 in the normal direction relative to the outer peripheral surface of the developing sleeve 24 has an upstream maximum value P1, a minimum value B, and a downstream maximum value P2 in a named order from an upstream side toward a downstream side with respect to the rotational direction of the developing sleeve 24. Such a magnetic flux density distribution is hereinafter called two peaks in some cases. Incidentally, a magnetic flux density distribution, having one maximum value, of the regulating magnetic pole of the magnet roller is hereinafter called one peak in some cases. In the case of this embodiment, the magnet roller 24*m* with the two peaks is used, and the regulating member 25 is disposed so as to oppose a position between the upstream maximum value P1 and the downstream maximum value P2. Incidentally, in the following, the upstream maximum value P1 and the downstream maximum value P2 are also called an upstream peak P1 and a downstream peak P2, respectively. Further, a position of the upstream peak P1 and a position of the downstream peak P2 are also called simply the upstream peak P1 and the downstream peak P2, respectively, in some cases. Further, positions of the maximum values such as a position of the maximum value of the magnetic flux density Br and are also called simply the maximum values in some cases.

Figure 3:
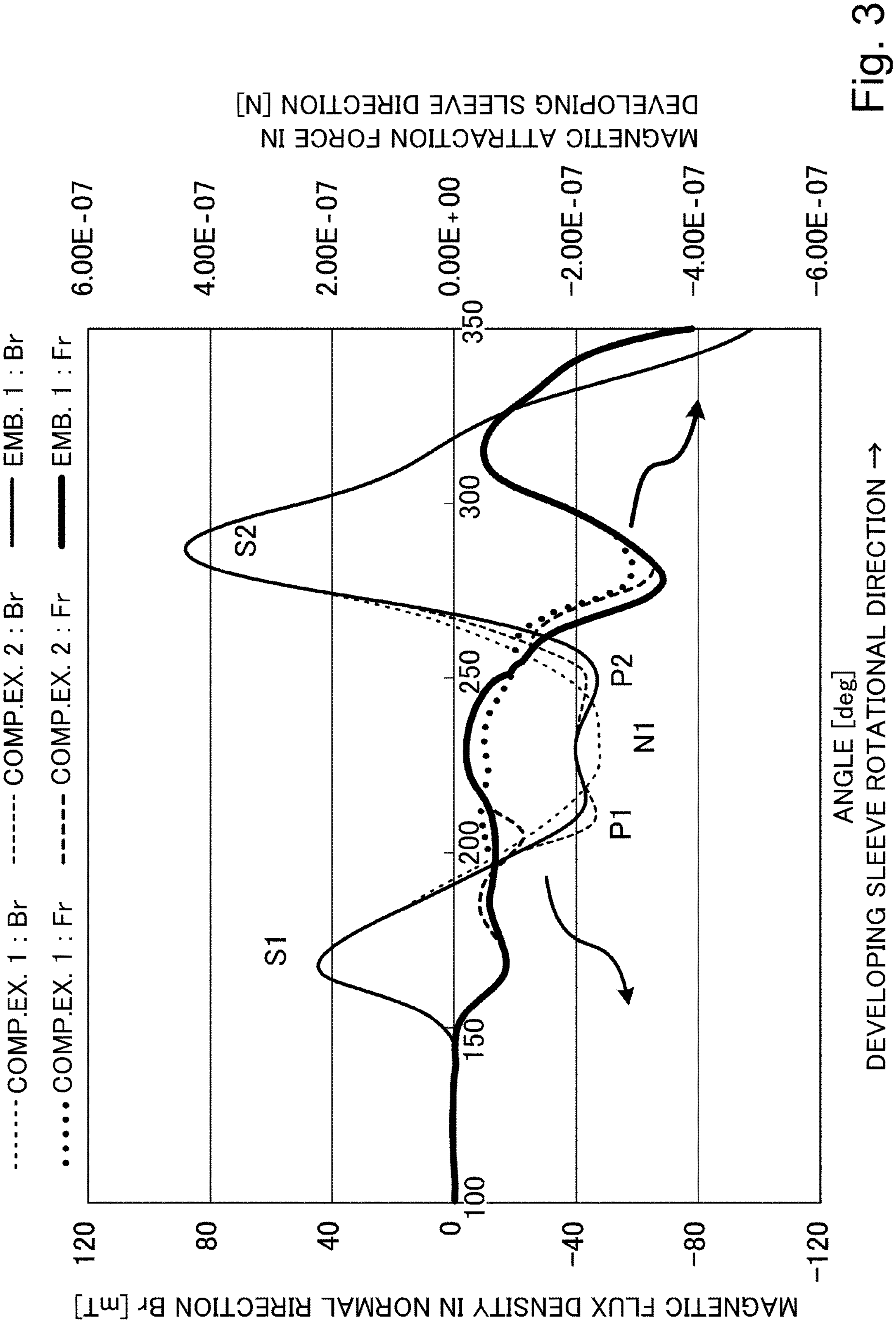
FIG. 3 is a graph showing a relationship between an angle with a regulating member arrangement region, as a center, of a developing sleeve, a magnetic flux density in a normal direction, and a magnetic attraction force Fr in a developing sleeve center direction, according to each of an embodiment 1, a comparison example 1, and a comparison example 2.

In the following, an embodiment 1 including the magnet roller 24*m* with the regulating magnetic pole N1 in this embodiment will be described with reference to FIG. 3 while being compared with comparison examples 1 and 2. FIG. 3 is a graph schematically showing a distribution of the magnetic flux density Br on the developing sleeve 24 by the magnet roller 24*m*. Incidentally, the magnetic flux density Br accurately refers to a normal direction component of a magnetic flux density B relative to the developing sleeve. Hereinafter, the "magnetic flux density Br in the normal direction" is simply called the "magnetic flux density" in accordance with the custom in some cases. In the case where the magnetic flux density is simply called the magnetic flux density, the magnetic flux density refers to the "magnetic flux density Br in the normal direction". The magnetic flux density Br of each of the magnet rollers (with respect to the normal direction) in the embodiment 1 and in the comparison examples 1 and 2 was measured using a magnetic field measuring device ("MS-9902", manufactured by F. W. BELL) in which a distance between a probe which is a member of the magnetic field measuring device and the surface of the developing sleeve 24 is of about 100 μm.

In FIG. 3, an magnetic attraction force Fr by which the developer (carrier) is attracted in a center direction of the developing sleeve 24 is also schematically shown together. In the following the "magnetic attraction force Fr in the center direction of the developing sleeve" is simply called the "magnetic attraction force" in some cases. That is, the "magnetic attraction force" refers to the "magnetic attraction force Fr in the center direction of the developing sleeve". The magnetic attraction force Fr of the developing sleeve 24 can be derived from the magnetic flux density Br in the normal direction and is represented by the following formula 1.

$$F_\gamma = \frac{\mu - \mu_0}{\mu_0(\mu + 2\mu_0)} 2\pi b^3 \left( B_\gamma \frac{\partial B_\gamma}{\partial_\gamma} + B_\theta \frac{\partial B_\theta}{\partial_\gamma} \right) \quad \text{(formula 1)}$$

In the formula 1, μ represents (magnetic) permeability of a magnetic carrier, $\mu_0$ represents space permeability, and b represents a radius of the magnetic carrier. The magnetic flux density Bθ is acquired from the following formula 2 by using a value of the magnetic flux density Br in the normal direction measured by the above-described method.

$$B_\theta = -\frac{\partial A_z(r, \theta)}{\partial_\gamma} \left( A_z(R, \theta) = \int_0^\theta R B_\gamma d\theta \right) \quad \text{(formula 2)}$$

In FIG. 3, in addition to the regulating magnetic pole N1, the upstream-side scooping magnetic pole S1 and the downstream-side feeding magnetic pole S2 with respect to the rotational direction of the developing sleeve 24 are also shown together. In this case, as the magnet roller 24*m*, the magnet roller 24*m* in this embodiment (i.e., the magnet roller using the regulating magnetic pole N1 consisting of the two peaks) was used in the embodiment 1.

Further, different from the embodiment 1, a magnet roller using a regulating magnetic pole N1 consisting of one peak was used in the comparison example 1, and similarly as the embodiment 1, the magnet roller using the regulating magnetic pole N1 consisting of the two peaks was used in the comparison example 2. In the regulating magnetic pole N1 consisting of the two peaks, the magnetic flux density Br in the normal direction has a magnetic flux density distribution such that an upstream maximum value (upstream peak) P1, a minimum value B, and a downstream maximum value (downstream peak) P2 in a named order from the upstream side toward the downstream side with respect to the rotational direction of the developing sleeve 24.

In FIG. 3, the magnetic flux density Br (slid line) in the normal direction of the regulating magnetic pole N1 in this embodiment as the embodiment 1, the magnetic flux density Br (dotted line) in the normal direction in the comparison example 1, and the magnetic flux density Br (broken line) in the normal direction in the comparison example 2 are shown. Further, in FIG. 3, magnetic attraction forces Fr in each of the embodiment 1, the comparison example 1, and the comparison example 2 were shown together by associated bold (thick) lines, respectively.

In the comparison example 1, a shape (distribution) of the magnetic flux density Br of the regulating magnetic pole is one peak, but the shape of the magnetic flux density Br of the regulating magnetic pole N1 in each of the embodiment 2 and the comparison example 1 is the two peaks. By employing the magnetic flux density distribution such that the magnetic flux density Br of the regulating magnetic pole N1 has the two peaks, a region in which a change in magnetic flux density distribution with respect to the rotational direction of the developing sleeve 24 (θ direction change) is moderate can be further extended. For this reason, by disposing the regulating member 25 so as to oppose the position between the two peaks of the magnetic flux density Br of the regulating magnetic pole N1, compared with the case where the shape of the magnetic flux density Br is one peak as in the comparison example 1, even when a positional relationship with the regulating member 25 is deviated, the magnetic flux density is not readily changed, and thus the developer amount is not readily fluctuated. That is, it becomes possible to enlarge latitude in pole position (positional relationship between the regulating magnetic pole N1 and the regulating member 25).

On the other hand, when the magnetic attraction force Fr in the comparison example 2 is compared with the magnetic attraction force Fr in the comparison example 1, there is a peak of the magnetic attraction force Fr on an upstream side of the regulating magnetic pole N1, which is not observed in the comparison example 1 and there is a tendency that the magnetic attraction force Fr is smaller on the upstream side of the regulating magnetic pole N1 as a whole in the comparison example 1 than in the comparison example 2. As described above, when the magnetic attraction force Fr of the carrier increases particularly on the side upstream of the regulating member 25 with respect to the rotational direction of the developing sleeve 24, the developer is contained in the developer stagnation portion formed upstream of the regulating member 25 and thus is liable to stagnate at the developer stagnation portion. For that reason, there is a liability that the developer deterioration is liable to occur due to an increase in torque.

The reason why the increase in magnitude of the magnetic attraction force Fr on the upstream side of the regulating magnetic pole N1 is larger than that in the comparison example 1 would be considered as follows. That is, the magnetic attraction force Fr by which the carrier is attracted in the center direction of the developing sleeve 24 comprises the product of the magnitude of the magnetic flux density and an r-direction change thereof (partial differential) (see the formula 1). The magnetic flux density distribution of the regulating magnetic pole N1 in comparison example 1 has a shape such that the magnetic flux density gradually increases moderately from the upstream side where the scooping magnetic pole S1 exists. On the other hand, the magnetic flux density distribution of the regulating magnetic pole N1 in the comparison example 2 has a shape such that the upstream peak P1 of the two peaks P1 and P2 is close to the upstream scooping magnetic pole S1 and the magnetic flux density abruptly increases from the scooping magnetic pole S1 toward the upstream peak P1 (i.e., a degree of inclination is large).

In a region where the magnetic flux density abruptly changes, the r-direction change thereof (partial differential) is also liable to become large.

As a result, in the comparison example 2 in which the shape of the magnetic flux density distribution has the two peaks, the absolute value of the magnetic flux density is large and the r-direction change thereof (partial differential) is also liable to become large, so that the magnetic attraction force Fr comprising the product thereof is liable to become large. In actuality, from FIG. 3, it is understood that the magnetic attraction force Fr also becomes large at a portion where a θ direction change (inclination) of the magnetic flux density Br is large.

Next, the embodiment 1 will be described. In the embodiment 1, the magnetic flux density distribution of the regulating magnetic pole N1 has the two-peak shape which is the same as the two-peak shape in the comparison example 1, but a constitution in which the magnetic flux density distribution in the neighborhood of the regulating magnetic pole N1 satisfies the following requirements (A) to (F) so that the magnetic attraction force Fr does not increase on the side upstream of the regulating magnetic pole N1 as in the comparison example 2. Of these requirements, the embodiment 1 satisfies at least either of the requirements (C) to (F).

(A) The regulating member 25 is disposed opposed to a position between the position of the upstream peak P1 and the downstream peak P2.

(B) With respect to the rotational direction of the developing sleeve 24, an angle between the position of the upstream peak P1 and the position of the downstream peak P2 is 20° or more and less than 50°.

(C) An absolute value |Br| of the upstream peak P1 is smaller than an AV |Br| of the downstream peak P2.

(D) $\theta 1 > \theta 2$, where θ1 represents an angle, with respect to the rotational direction of the developing sleeve 24 (developer carrying member rotational direction), from a position where the magnetic flux density Br in the normal direction on the side upstream of the position of the upstream peak P1 is a half value of the upstream peak P1 to the position of the upstream peak P1, and θ2 represents an angle, with respect to the rotational direction of the developing sleeve 24, from a position where the magnetic flux density Br in the normal direction on the side downstream of the position of the downstream peak P2 is a half value of the downstream peak P2 to the position of the downstream peak P2.

(D)' $B1/\theta 1 < B2/\theta 2$, where B1 represents an absolute value of the upstream peak P1, and B2 represents an absolute value of the downstream peak P2.

(E) $\theta 3 > \theta 4$, where θ3 is an angle from a position of an absolute value of a maximum value of the magnetic flux density Br of the scooping magnetic pole S1 in the normal direction to the position of the upstream peak P1 with respect to the rotational direction of the developing sleeve 24, and θ4 represents an angle from a position of an absolute value of a maximum value of the magnetic flux density Br of the feeding magnetic pole S2 in the normal direction to the position of the downstream peak P2 with respect to the rotational direction of the developing sleeve 24.

(F) With respect to the rotational direction of the developing sleeve 24, an angle θ1 from the magnetic flux density Br in the normal direction on the side upstream of the upstream peak P1 is an absolute value of the upstream peak P1 to the position of the upstream peak P1 is 13° or more and less than 50° (50°>θ1≥13°).

In addition to the above-described requirements, at least either of the following requirements (H) and (I) may preferably be satisfied.

(H) A difference between an absolute value |Br| of a maximum value of the peak which is a smaller one of the upstream peak P1 and the downstream peak P2 in terms of the absolute value |Br| of the magnetic flux density in the normal direction, and an absolute value |Br| of a minimum value B is 10 mT or less.

(I) A difference between the absolute value |Br| of the upstream peak P1 and the absolute value |Br| of the downstream peak P2 is 2 mT or more and 10 mT or less.

The above-described requirements will be specifically described. As described above, at the portion where the θ-direction change (inclination) of the magnetic flux density Br is large, the magnetic attraction force Fr also becomes large. In the comparison example 2, as a result that the magnetic flux density distribution shape of the regulating magnetic pole N1 has the two peaks, the θ-direction change of the magnetic flux density Br was large on the side upstream of the regulating magnetic pole N1, so that the magnetic attraction force Fr also became large. Therefore, in this embodiment, even when the magnetic flux density distribution shape of the regulating magnetic pole N1 has the two peaks, the θ direction change of the magnetic flux density Br on the side upstream of the regulating magnetic pole N1 is prevented from becoming large. As a result, in the embodiment 1, the magnetic attraction force Fr is suppressed to a relatively low level.

In the case where the magnetic flux density distribution of the regulating magnetic pole N1 has the two-peak shape as in the comparison example 2 and in the embodiment 1, a region where the change (inclination) of the magnetic flux density Br on the side upstream of the regulating magnetic pole N1 is liable to become large is on a side further upstream of the upstream peak P1 of the regulating magnetic pole N1. This is because the upstream peak P1 having a relatively high value of the magnetic flux density Br shifts in the direction of the scooping magnetic pole S1 disposed upstream of the regulating magnetic pole N1, by employing the two-peak shape, and therefore, the inclination of the magnetic flux density Br is liable to become large. Therefore, in the embodiment 1, compared with the comparison example 2, the inclination of the magnetic flux density Br on the side upstream of the upstream peak P1 of the magnetic flux density Br of the regulating magnetic pole N1 was made small.

[θ1 (Requirement (F)]

Figure 4:
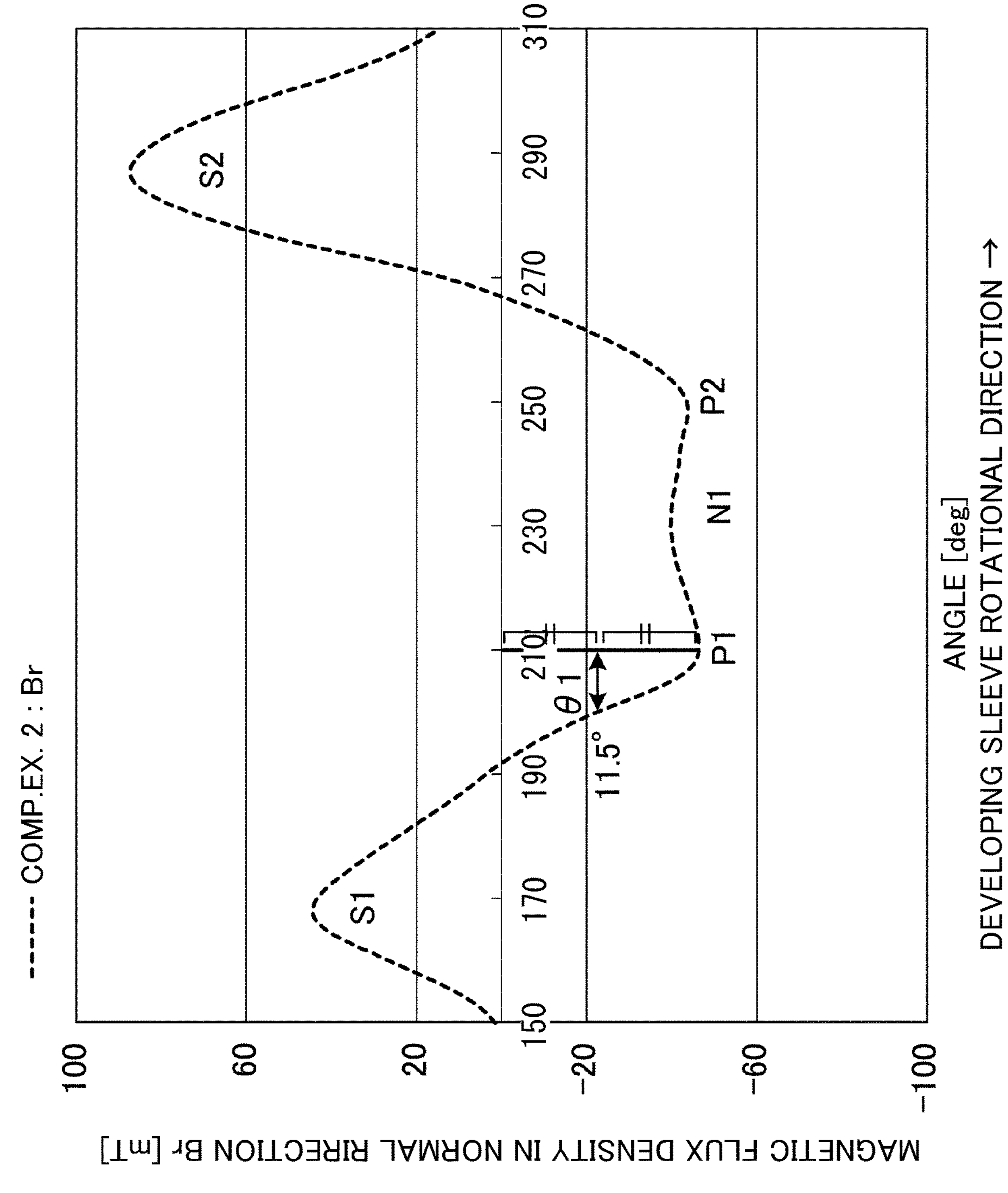
FIG. 4 is a graph showing the relationship between the angle with the regulating member arrangement region, as the center, of the developing sleeve, and the magnetic flux density in the normal direction, according to the comparison example 2.
Figure 5:
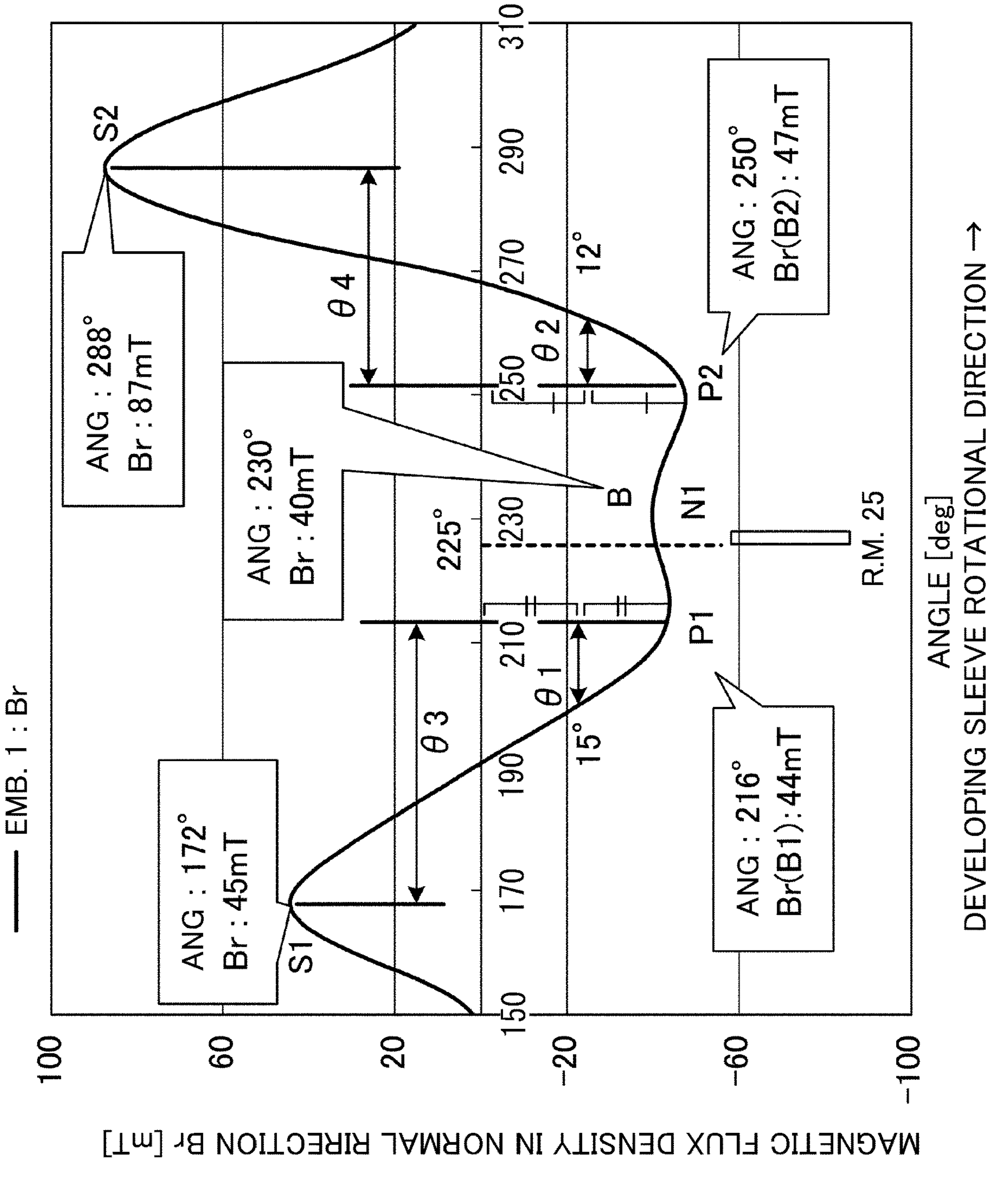
FIG. 5 is a graph showing the relationship between the angle with the regulating member arrangement region, as the center, of the developing sleeve, and the magnetic flux density in the normal direction, according to the embodiment 1.

Here, as an index indicating the inclination of the magnetic flux density Br on the side upstream of the upstream peak P1 of the magnetic flux density Br of the regulating magnetic pole N1, the angle θ1, on the side upstream of the upstream peak P1 of the magnetic flux density Br of the regulating magnetic pole N1, from the upstream peak P1 position until the magnetic flux density becomes a half value is induced. In FIGS. 4 and 5, the angles θ1 in the comparison example 1 and the embodiment 1 are shown, respectively, together with the magnetic flux density distribution. On the side upstream of the upstream peak P1 of the magnetic flux density Br of the regulating magnetic pole N1, the θ1 from the upstream peak P1 position until the magnetic flux density Br becomes the half value is 11.5° in the comparison example 1, and on the other hand, is 15° in the embodiment 1. With a larger value of this angle θ1, the inclination of the magnetic flux density Br on the side upstream of the upstream peak P1 of the magnetic flux density Br of the regulating magnetic pole N1 becomes smaller, with the result that the magnetic flux density Br can be suppressed to the low level.

In actuality, as shown in FIG. 3, the magnetic attraction force Fr in the embodiment 1 is suppressed to the same degree (level) as the magnetic attraction force Fr in the comparison example 1.

A developer deterioration test was conducted for each of the comparison example 1, the comparison example 2, and the embodiment 1. In the developing device using the magnet roller in each of the comparison example 1, the comparison example 2, and the embodiment 1, first, an image forming operation (initial image formation) was performed, and thereafter only stirring of the developer was carried out for 1 hour. Then, the image forming operation (image formation) was performed in the same condition as in the initial image formation. Incidentally, only the stirring of the developer refers to circular feeding of the developer while stirring the developer in the developing container 21 by driving the first feeding screw 22 and the second feeding screw 23 without performing a developing operation for developing the electrostatic latent image on the photosensitive drum 81. At this time, the developing sleeve 24 is also driven. On the photosensitive drum 81, the electrostatic latent image is not formed, and the developing bias is not applied. For that purpose, a jig capable of driving the developing device alone may be prepared and used.

In the comparison example 2, compared with the comparison example 1, a lowering in density of the image formed by the image forming operation after the stirring relative to the image formed by the initial image forming operation was large. For this reason, in the case of the constitution of the comparison example 2, it turned out that the developer is liable to deteriorate. On the other hand, in the embodiment 1, a result was substantially the same as a result in the comparison example 1. From these results, it can be said that the magnet roller **24*m* in the embodiment 1 includes the regulating magnetic pole N1 having the magnetic flux density Br with the two-peak shape, but the inclination of the magnetic flux density Br on the side upstream of the upstream peak P1 of the magnetic flux density Br of the regulating magnetic pole N1** is made small, with the result that the magnetic attraction force Fr was suppressed and thus the developer deterioration was able to be suppressed.

In addition, a magnet roller for which on the side upstream of the upstream peak P1 of the magnetic flux density Br of the regulating magnetic pole N1, the angle θ1 from the upstream peak P1 position until the magnetic flux density Br becomes the half value is 13° was subjected to a similar test. As a result, although the developer was liable to be somewhat deteriorated compared with the developer in the comparison example 1 and the embodiment 1, a degree of the developer deterioration was suppressed compared with that in the comparison example 2. Accordingly, in the case where the magnetic flux density distribution of the regulating magnetic pole N1 has the two-peak shape, on the side upstream of the upstream peak P1, the angle θ1 from the upstream peak P1 position until the magnetic flux density Br becomes the half value is made 13° or more (requirement (F)), preferably 15° or more, so that it is possible to suppress the developer deterioration due to the increase in magnetic attraction force Fr, which is a problem in the case where the magnetic flux density distribution has the two peaks. That is, by satisfying the above-described requirements (A), (B) and (F), even when the magnetic flux density distribution of the regulating magnetic pole N1 ha the two-peak shape, the developer deterioration can be suppressed. However, when the angle θ1 is made 50° or more, the angle θ1 is excessively large, so that there is a possibility that the large angle θ1 has the influence on a degree of freedom of the arrangement of other magnetic poles. Accordingly, the angle θ1 may preferably be made less than 50°. Particularly, as in this embodiment, the influence is more liable to arise in the case where the magnet roller 24*m* includes the magnetic poles of 7 or more poles.

Incidentally, as regards the angle θ1 from the upstream peak P1 position until the magnetic flux density Br becomes the half value, when the angle θ1 is excessively large, a state in which the absolute value of the magnetic flux density Br is high is continued in a wide range, so that there is a possibility that the increase in magnetic flux density Br is newly induced. For that reason, the angle θ1 from the upstream peak P1 position until the magnetic flux density Br may preferably be made 30° or less (θ1≤30°), more preferably 25° or less (θ1≤25°).

[Difference in Magnetic Flux Density Between Maximum Value and Minimum Value (Requirement (H)]

The magnet roller 24*m* in this embodiment has the magnetic flux density distribution of the regulating magnetic pole N1 which has the two-peak shape, and by employing the two-peak shape, even when a positional relationship between the regulating magnetic pole N1 and the regulating member 25 is deviated, the magnetic flux density Br does not readily change and thus the developer amount is hard to fluctuate, so that the pole position latitude can be made wide. Here, the "magnetic flux density distribution of the regulating magnetic pole N1 which has the two-peak shape" refers to that as shown in FIG. 5, the magnetic flux density of the regulating magnetic pole N1 includes the upstream peak P1 and the downstream peak P2 which are two maximum values and has a shape such that a recessed-shaped minimum value B is disposed between the two peaks P1 and P2 (in this case, the maximum value and the minimum value refer to those in terms of an absolute value). At this time, a maximum value and a minimum value which are accompanied with measurement noise of 0.5 mT or less are disregarded.

Here, when the minimum value B is excessively small relative to the two peaks P1 and P2, the magnetic flux density fluctuates between the two peaks P1 and P2, and thus can cause a fluctuation in developer amount. For this reason, it is preferable that a difference between the feeding (maximum value), of the two peaks P1 and P2, smaller in absolute value and the minimum value B becomes 10 mT or less (requirement (H)). Preferably, the difference between the peak, of the two peaks P1 and P2, larger in absolute value and the minimum value B becomes 10 mT or less.

[Interval Between Two Peaks (Requirement (B))]

As regards an interval between the two-peaks P1 and P2, by increasing the interval, the pole position latitude is made wider. For that reason, when an angle (interval) between the peaks P1 and P2 is at least 20° or more (requirement (B)), preferably 25° or more, more preferably 30° or more, it is possible to obtain a sufficient pole position latitude. However, when the interval between the peaks P1 and P2 is made 50° or more, the angle is excessively large, so that there is a possibility that the large angle has the influence on the degree of freedom of arrangement of other magnetic poles. Accordingly, the interval between the peaks P1 and P2 may preferably be less than 50°. Particularly, in the case where the magnet roller 24*m* includes the magnetic poles of 7 or more poles, the influence is more liable to arise.

As shown in FIG. 5, the two peaks P1 and P2, and the minimum value B of the regulating magnetic pole N1 of the magnet roller 24*m* in the embodiment 1 are the following values, respectively.

Upstream peak P1: angle of 216°, magnetic flux density of 44 T

Downstream peak P2: angle of 250°, magnetic flux density of 47 mT

Minimum value B: angle of 230°, magnetic flux density of 40 mT

Therefore, as regards the regulating magnetic pole N1 of the magnet roller 24*m* in this embodiment, the angle value the two peaks P1 and P2 is 34°, a magnetic flux density difference between the upstream peak P1 and the minimum value B is 4 mT, and a magnetic flux density difference between the downstream peak P2 and the minimum value B is 7 mT, so that a fluctuation, in magnetic flux density Br, of 10 mT pole can be achieved within an angular range of 30° or more with respect to a circumferential direction. Further, by disposing the regulating member 25 in a region, between the two peaks P1 and P2, in which the magnetic flux density change is suppressed, it becomes possible to obtain the pole position latitude.

In this embodiment, the change in magnetic flux density Br on the side upstream of the upstream peak P1 of the two peaks P1 and P2 of the regulating magnetic pole N1 is made moderate, so that the increase in magnetic attraction force Fr on the side upstream of the regulating member 25 is prevented and thus the developer deterioration is suppressed as described above. In the case where the change in magnetic flux density Br on the side upstream of the upstream peak P1 is made moderate, there arises the following liability.

As is understood from comparison between the comparison example 2 and the embodiment 1 in FIG. 3, when the change in magnetic flux density Br on the side upstream of the upstream peak P1 is made moderate, the position of the upstream peak P1 is liable to shift toward the downstream side.

When the position of the upstream peak P1 shifts toward the downstream side, the interval between the two peaks P1 and P2 becomes narrow, so that there is a liability that the pole position latitude becomes narrow. Therefore, in this embodiment, by employing the following constitution, a wide interval between the two peaks P1 and P2 as described above is obtained.

[Change in Magnetic Flux Density on Sides Upstream and Downstream of Two Peaks (Requirements (C) and (D)]

The reason why the change in magnetic flux density Br on the side upstream of the upstream peak P1 is made moderate is that the upstream peak P1 is positioned on the side upstream of the regulating member 25, and therefore, when the magnetic attraction force Fr becomes large, there was a liability of the developer deterioration or the like due to the increase in torque at the developer stagnation portion on the side upstream of the regulating member 25. On the other hand, the neighborhood of the downstream peak P2 is positioned on the side downstream of the regulating member 25, and therefore, even when the magnetic attraction force Fr becomes large, there is no liability of the developer deterioration different from the case of the side upstream of the regulating member 25. When the change in magnetic flux density Br on the side downstream of the downstream peak P2 is made abrupt, it is possible to shift the downstream peak P2 toward a further downstream side. When the downstream peak P2 can be shifted toward the downstream side, it is possible to enlarge the interval between the two peaks P1 and P2.

Therefore, in the magnet roller 24*m* in the embodiment 1, the change in magnetic flux density Br on the side downstream of the downstream peak P2 of the regulating magnetic pole N1 is made abrupt while the change in magnetic flux density Br on the side upstream of the upstream peak P1 of the regulating magnetic pole N1 is made moderate. A shifted amount of the upstream peak P1 toward the downstream side is compensated by a shift of the downstream peak P2 toward the downstream side, so that a wide interval between the two peaks P1 and P2 as described above is obtained.

When the change in magnetic flux density Br of the regulating magnetic pole N1 on the side downstream of the downstream peak P2 is made more abrupt than the change in magnetic flux density Br of the regulating magnetic pole N1 on the side upstream of the upstream peak P1, a balance of both of suppression of the developer deterioration and ensuring of the pole position latitude can be fully satisfied. Here, the change in magnetic flux density Br can be accurately represented by inclination (Δ(magnetic flux density Br)/Δ (angle)). Accordingly, in order that the inclination of the magnetic flux density Br of the regulating magnetic pole N1 on the side downstream of the downstream peak P2 made more abrupt than the inclination of the magnetic flux density Br of the regulating magnetic pole N1 on the side upstream of the upstream peak P1, the following may only be required.

First, as regards the Δ(magnetic flux density Br), the inclination of the magnetic flux density Br can be made large by increasing the Δ(magnetic flux density Br). The absolute value |Br| (B2) of the magnetic flux density of the downstream peak P2 is made larger than the absolute value |Br| (B1) of the magnetic flux density of the upstream peak P1, the downstream-side Δ(magnetic flux density Br) can be made larger than the upstream-side Δ(magnetic flux density Br) (requirement (C)). Next, as regards the angle, the inclination of the magnetic flux density can be made large by decreasing the A (angle). When the angle θ2 from the downstream peak P2 position until the magnetic flux density Br becomes the half value on the side downstream of the downstream peak P2 is made smaller than the angle θ1 from the upstream peak P2 position until the magnetic flux density Br becomes the half value on the side upstream of the upstream peak P1 (θ1>θ2), the downstream-side Δ (angle) can be made smaller than the upstream-side Δ (angle) (requirement (D)). By satisfying the relationship between the two at the same time, the change (inclination) in magnetic flux density of the regulating magnetic pole N1 on the side downstream of the downstream peak P2 can be always made more abrupt than the change (inclination) in magnetic flux density of the regulating magnetic pole N1 on the side upstream of the upstream peak P1.

As shown in also FIG. 5, in the embodiment 1, the following setting is made from the above-described viewpoints.

First, as regards the magnetic flux density Br, as described above, the absolute value B1 of the magnetic flux density of the upstream peak P1 is 44 mT, whereas the absolute value B2 of the magnetic flux density of the downstream peak P2 is 47 mT, so that the absolute value B2 of the magnetic flux density of the downstream peak P2 is made larger than the absolute value B1 of the magnetic flux density of the upstream peak P1 (B1<B2).

Next, as regards the angle, the angle θ1 from the upstream peak P1 position until the magnetic flux density Br becomes the half value on the side upstream of the upstream peak P1 is 15°, whereas the angle θ2 from the downstream peak P1 position until the magnetic flux density Br becomes the half value on the side downstream of the downstream peak P2 is 12°. Accordingly, the angle θ2 from the downstream peak P2 position until the magnetic flux density Br becomes the half value on the side downstream of the downstream peak P2 is smaller than the angle θ1 from the upstream peak P1 position until the magnetic flux density Br becomes the half value on the side upstream of the upstream peak P1 (θ1>θ2). In other words, the angle θ1 from the position where the magnetic flux density Br becomes the half value of the magnetic flux density Br on the side upstream of the upstream peak P1 to the upstream peak P1 is larger than the angle θ2 from the position where the magnetic flux density Br becomes the half value of the magnetic flux density Br on the side downstream of the downstream peak P2 to the downstream peak P2. Therefore, a relationship relating to both of the Δ(magnetic flux density) and the A (angle) is satisfied at the same time.

By this, in this embodiment, the wide interval between the two peaks P1 and P2 as described above is obtained.

[Difference in Magnetic Flux Density Between Two Peaks (Requirement (I))]

In this embodiment, the magnetic flux density absolute value B2 of the downstream peak P2 may preferably be made larger than the magnetic flux density absolute value B1 of the upstream peak P1 by 2 mT or more. That is, a difference between these absolute values may preferably be made 2 mT or more. This is because of preventing reverse in magnitude relationship between the magnetic flux density absolute value B1 of the upstream peak P1 and the magnetic flux density absolute value B2 of the downstream peak P2 caused depending on a part tolerance of the magnet roller. On the other hand, when the difference between the absolute values is made 10 mT or more, a fluctuation range of the magnetic flux density Br between the two peaks P1 and P2 becomes large, so that there is a liability that the large fluctuation range has the influence on the pole position latitude, and therefore, the difference between the absolute values may preferably be made 10 mT or less. That is, the difference between B1 an B2 may preferably be 2 mT or more and 10 mT (requirement (I)).

[Range of Angle]

Also, as regards the angle, in this embodiment, it is more preferable that the absolute value θ2 from the downstream peak P2 position until the magnetic flux density Br becomes the half value on the side downstream of the downstream peak P2 is 2° or more smaller than the angle θ1 from the upstream peak P1 position until the magnetic flux density Br becomes the half value on the side upstream of the upstream peak P1. That is, a difference between θ1 and θ2 may preferably be 2° or more. This is also because similarly as in the case of the above-described absolute value |Br| of the magnetic flux density, reverse in magnitude relationship depending on the part tolerance of the magnet roller is prevented. On the other hand, when the difference between θ1 and θ2 is made or more, there is an increase probability that the angle θ1 from the upstream peak P1 position until the magnetic flux density Br becomes the half value is 30° or more. As described above, a regards the angle θ1 from the upstream peak P1 position until the magnetic flux density Br becomes the half value, when the angle θ1 is made excessively large, a state in which the absolute value of the magnetic flux density Br is high continues in a wide range, so that there is a possibility that an increase in magnetic attraction force Fr is induced. For that reason, the difference between the angle θ1 from the upstream peak P1 position until the magnetic flux density Br becomes the half value on the side upstream of the upstream peak P1 and the angle θ2 from the downstream peak P2 position until the magnetic flux density Br becomes the half value on the side downstream of the downstream peak P2 may preferably be made 20° or less, in one preferably be made 15° or less. That is, the difference between θ1 and θ2 may preferably be 2° or more and 20° or less, more preferably be 2° or more and 15° or less.

[Angle and Magnetic Flux Density (Requirement (D)')]

Incidentally, as described hereinabove, the absolute value |Br| of the magnetic flux density and the angle from the peak position of the magnetic flux density Br until the magnetic flux density Br becomes the half value are separately treated, but in this embodiment, a ratio of the magnetic flux density absolute value |Br| to the angle from the peak position of the magnetic flux density Br until the magnetic flux density Br becomes the half value (i.e., (magnetic flux density absolute value |Br|)/(angle from the peak position of the magnetic flux density Br until the magnetic flux density Br becomes the half value) may be directly compared. In this case, when B1 (the magnetic flux density absolute value |Br| of the upstream peak P1)/θ1 (the angle from the upstream peak P1 position until the magnetic flux density Br becomes the half value on the side upstream of the upstream peak P1) can be made smaller than B2 (the magnetic flux density absolute value |Br| of the downstream peak P2)/θ2 (the angle from the downstream peak P2 position until the magnetic flux density Br becomes the half value on the side downstream of the downstream peak P2), a constitution in which the change (inclination) of the magnetic flux density is moderate on the upstream side and is abrupt on the downstream side can be realized.

That is, when $B1/\theta1<B2/\theta2$ (requirement (D)') is satisfied, similarly as in the case where the above-described requirements (C) and (D) are satisfied, the change in magnetic flux density Br on the side downstream of the downstream peak P2 can be made abrupt while the change in magnetic flux density Br on the side upstream of the upstream peak P1 is made moderate. By this, the shifted amount of the upstream peak P1 toward the downstream side is compensated by the shift of the downstream peak P2 toward the downstream side, so that the wide interval between the two peaks P1 and P2 as described above can be obtained.

In the embodiment 1, $B1/\theta1=44$ Mt/15°=2.93, whereas $B2/\theta2=47$ mT/12°=3.91, so that the above-described relationship is satisfied. In this embodiment, when B1/θ1 is smaller than B2/θ2 by 0.5 or more, the relationship is well-modulated between the upstream side and the downstream side, so that such a case is preferable from the viewpoint of compatibly realizing the suppression of the developer deterioration and the ensuring of the pole position latitude.

[Relationship Between Regulating Magnetic Pole and Adjacent Magnetic Pole (Requirement (E))]

Here, the inclination of the magnetic flux density Br of the regulating magnetic pole N1 is also largely influenced by a relationship with adjacent magnetic poles.

Conversely, by adjusting the relationship with the adjacent magnetic poles, the inclination of the magnetic flux density Br can be made moderate or abrupt. The inclination of the magnetic flux density Br on the side upstream of the upstream peak P1 of the regulating magnetic pole N1 is largely influenced by the relationship with the second magnetic pole (the scooping magnetic pole S1) disposed upstream of and adjacent to the regulating magnetic pole N1. On the other hand, the inclination of the magnetic flux density Br on the side downstream of the downstream peak P1 of the regulating magnetic pole N1 is largely influenced by the third magnetic pole (the feeding magnetic pole S2 in this embodiment) disposed downstream of and adjacent to the regulating magnetic pole N1. In either case, the inclination is liable to become moderate when the angle with the adjacent magnetic pole is large and is liable to become abrupt when the angle of the adjacent magnetic pole is small.

Therefore, as regards the magnetic flux density Br, the absolute value B2 of the magnetic flux density of the downstream peak P2 is made larger than the absolute value B1 of the magnetic flux density of the upstream peak P1, and at the same time, as regards the angle, an angle θ4 from downstream peak P2 of the regulating magnetic pole N1 to the downstream feeding magnetic pole (peak) S2 is made smaller than an angle θ2 from the upstream peak P1 of the regulating magnetic pole N1 to the upstream scooping magnetic pole (peak) S1 ($\theta3>\theta4$) (requirement (E)). By this, it is possible that the change (inclination) of the magnetic flux density on the side downstream of the downstream peak P2 of the regulating magnetic pole N1 is made more abrupt than the change (inclination) of the magnetic flux density on the side upstream of the upstream peak P1 of the regulating magnetic pole N1.

In the embodiment 1, as regards the magnetic flux density, the absolute value B1 of the magnetic flux density of the upstream peak P1 is 44 mT, whereas the absolute value B2 of the magnetic flux density of the downstream peak P2 is 47 mT, so that the absolute value B2 of the magnetic flux density of the downstream peak P2 is larger than the absolute value B1 of the magnetic flux density of the upstream peak P1. On the other hand, as regards the angle, as shown in FIG. 5, the angle θ3 from the upstream peak P1 of the regulating magnetic pole N1 to the upstream scooping magnetic pole (peak) S1 is 44°, whereas the angle θ4 from the downstream peak P2 of the regulating magnetic pole N1 to the downstream feeding magnetic pole (peak) S2 is 38° and thus is smaller than the angle θ3. Accordingly, the embodiment 1 satisfies the relationships regarding the magnetic flux density and the angle at the same time, so that the effect as described above can be obtained even in the above-described constitution.

As described above, the difference between the absolute value B1 of the magnetic flux density of the upstream peak P1 and the absolute value B2 of the magnetic flux density of the downstream peak P2 may preferably be 2 mT or more and 10 mT or less. On the other hand, the difference between the angle θ3 from the upstream peak P1 of the regulating magnetic pole N1 to the upstream scooping magnetic pole (peak) S1 and the angle θ4 from the downstream peak P2 of the regulating magnetic pole N1 to the downstream feeding magnetic pole (peak) S2 may preferably be 2° or more. This is also because of prevention of reverse in magnitude relationship depending on the part tolerance of the magnet roller.

Incidentally, the magnetic pole S2 disposed downstream of the regulating magnetic pole N1 is the developing magnetic pole in many cases, but may preferably be the feeding magnetic pole as in this embodiment. This is because the developing magnetic pole is an important magnetic pole for determining an image in a developing step and therefore a degree of freedom of a change is low, whereas the feeding magnetic pole is relatively high in degree of freedom of the change. As already described above, the magnet roller 24*m* in this embodiment includes the seven magnetic poles. For that reason, the magnetic pole disposed downstream of the regulating magnetic pole N1 can be easily made the feeding magnetic pole S2. However, even when the magnetic pole disposed downstream of the regulating magnetic pole N1 is the developing magnetic pole, this embodiment is applicable to the developing magnetic pole.

[Arrangement of Regulating Member (Requirement (A))]

As regards an arrangement position of the regulating member 25, as described above, the regulating member 25 is disposed so as to oppose the position between the upstream peak P1 and the downstream peak P2 of the magnetic flux density Br of the regulating magnetic pole N1 of the magnet roller 24*m* (requirement (A)). By this, even when the arrangement of the regulating member 25 is derived, the change in magnetic flux density Br is moderate, and therefore, the fluctuation in developer amount can be suppressed. In this embodiment, the absolute value B1 of the magnetic flux density Br of the upstream peak P1 is made smaller than the absolute value B2 of the magnetic flux density Br of the downstream peak P2, and therefore, the change in magnetic flux density Br is more moderate on the side upstream of the minimum value B of the two peaks P1 and P2. For that reason, the arrangement of the regulating member 25 may preferably be on the side upstream of the minimum value B between the upstream peak P1 and the downstream peak P2 of the magnetic flux density Br of the regulating magnetic pole N1.

In FIG. 5, the arrangement position of the regulating member 25 in the embodiment 1 was illustrated. In the embodiment 1, the regulating member was disposed 5° upstream of the minimum value B between the upstream peak P1 and the downstream peak P2 of the magnetic flux density Br of the regulating magnetic pole N1.

Here, a line connecting an upstream end position of the fee end (regulating portion) of the regulating member 25 opposing the developing sleeve 24 with a center of the developing sleeve 24 is called the arrangement position of the regulating member 25. The reason why the upstream end is employed is that the developer amount is actually regulated on the upstream side by the regulating member 25 and the arrangement of the upstream end of the regulating member 25 is important.

A relationship between the arrangement position and the magnetic flux density distribution can be measured in the following manner. In general, the magnet roller 24*m* of the developing sleeve 24 is provided with a shaft, of which the end portion has a so-called D-cut shape, and a D-cut portion is fixed to the developing device 20 by a pole determining member so as to realize a desired magnetic pole arrangement. A distribution of the magnetic flux density for relative to (planed angle of) the D-cut portion of the magnet roller 24*m* is capable of being measured by the above-described magnetic field measuring device. On the other hand, when the arrangement position of the regulating member 25 relative to an axial center of the magnet roller 24*m* is measured, it is possible to know a relationship between the arrangement position of the regulating member 25 and the magnetic flux density distribution. The arrangement position of the regulating member 25 relative to the axial center of the magnet roller 24*m* may be measured with use of measuring equipment such as a protractor or the like, but in the case where the arrangement position is intended to be accurately determined, a general-purpose three-dimensional measuring machine (for example, "CRYSTA-Apex S series", manufactured by Mitutoyo Corp.) may be used.

In the case of this embodiment, by employing the above-described constitution, even in a magnetic flux density distribution in which the regulating magnetic pole N1 disposed closest to the regulating member 25 has the two maximum values (peaks), the developer deterioration can be suppressed. That is, in the case where the above-descried requirements (A) to (F), (H) and (I), in addition to the requirements (A) and (B), either one or a plurality of the requirements (C) to (F), (H) and (I) are satisfied, even when the magnetic flux density distribution of the regulating magnetic pole N1 has the two-peak shape, it is possible to suppress the deterioration in developer. For example, either one of (A)+(B)+(C)+(D), (A)+(B)+(C)+(D)', (A)+(B)+(C)+(E), (A)+(B)+(F), and (A)+(B)+(C)+(I) is satisfied, even the magnetic flux density distribution of the regulating magnetic pole N1 has the two-peak shape, the developer deterioration can be suppressed, and by further adding another requirement to each of the respective constitutions, the developer state can be suppressed more preferably.

Second Embodiment

A second embodiment will be described using FIG. 6 while making reference to FIG. 2. In the first embodiment, in addition to the requirements (A) and (B), either one of the plurality of the requirements (C) to (F), (H) and (I) are satisfied. On the other hand, in an embodiment 2, a requirement (G) described later is satisfied. Other constitutions and actions are similar to those in the above-described first embodiment, and therefore, the similar constitutions are emitted from description and illustration or briefly described by adding the same reference numerals or symbols. In the following, a difference from the first embodiment will be principally described.

In the case of this embodiment, of the above-described requirements (A) to (F), (H) and (T), at least the requirements (A) to (C) are satisfied. In addition to these, the following requirement (G) is satisfied.

(G) With respect to the rotational direction of the developing sleeve 24, a position of a maximum value of the magnetic flux density Br, in the normal direction, of the scooping magnetic pole S1 as an upstream-side magnetic pole is upstream of a half-value center position of the magnetic flux density Br, in the normal direction, of the scooping magnetic pole S1 (hereinafter, this position is referred to as the half-value center position of the scooping magnetic pole S1).

Incidentally, in addition to this requirement (G), at least either one of the requirements (H) and (I) may preferably be satisfied, and further, either one or a plurality of the requirements (D) to (F) may be satisfied.

Figure 6:
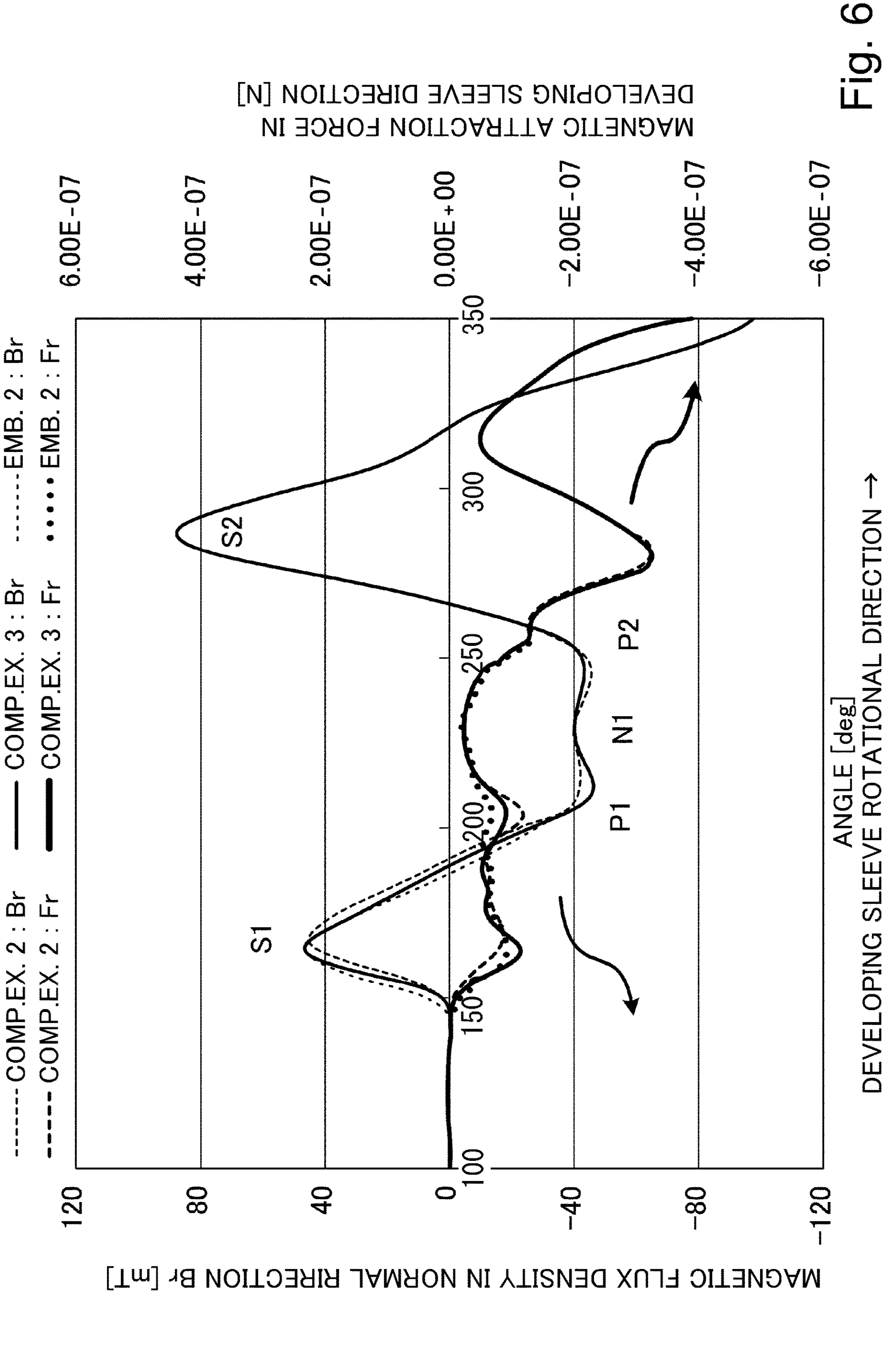
FIG. 6 is a graph showing a relationship between an angle with a regulating member arrangement region, as a center, of a developing sleeve, a magnetic flux density Br in the normal direction, and the magnetic attraction force Fr in the developing sleeve center direction, according to each of embodiment 2, a comparison example 2, and a comparison example 3 in a second embodiment.

Next, the embodiment 2 for the regulating magnetic pole N1 in this embodiment will be described while being compared with the comparison example 2 (which is the same as the comparison example 2 described in the embodiment 1) and a comparison example 3 as shown in FIG. 6. Outlines of image forming apparatuses 1 and developing devices 20 in the embodiment 2 are similar to the outline in the embodiment 1.

In FIG. 6, a magnetic flux density Br (dotted line) in the embodiment 2 for the regulating magnetic pole N1 in this embodiment, a magnetic flux density for (broken line) in the normal direction in the comparison example 2, and the magnetic flux density Br (solid line) in the normal direction in the comparison example 3 are shown. Further, in FIG. 6, associated magnetic attraction forces Fr in the embodiment 2, the comparative example 2, and the comparison example 3 are also represented together by a bold dotted line, a bold broken line, and a bold solid line, respectively.

As shown in FIG. 6, the embodiment 2 and the comparison example 3 are different from the comparison example 2 in that the distribution of the magnetic flux density Br of the scooping magnetic pole S1 disposed upstream of the regulating magnetic pole N1 is different from the associated distribution in the comparison example 2.

Specifically, compared with the comparison example 2, the distribution of the magnetic flux density Br of the scooping magnetic pole S1 has an asymmetrical shape, and the peak position of the magnetic flux density Br shifts toward the upstream side. By this, the magnet roller 24*m* in each of the embodiment 2 and the comparison example 3 can be expected that on the side upstream of the regulating magnetic pole N1, the change in the magnetic flux density Br becomes moderate and the magnetic attraction force Fr becomes small.

In actuality, when the magnetic attraction force Fr shown together with the magnetic flux density Br in FIG. 6 is checked, the magnetic attraction force Fr is smaller in the embodiment 2 and the comparison example 3 than in the comparison example 2 on the side upstream of the regulating magnetic pole N1.

As regards the asymmetry of the magnetic flux density Br in the embodiment 2 and the comparison example 3, a peak position (position of a maximum value) of the upstream magnetic pole (scooping magnetic pole S1) disposed upstream of the regulating magnetic pole N1 is disposed upstream of a half-value center position of the upstream magnetic pole (scooping magnetic pole S1) (requirement (G)). Incidentally, in the comparison example 2, the peak position is substantially 0°. That is, in the case of the comparison example 2, the peak position of the scooping magnetic pole S1 is substantially the same position as the half-value center position. When the part tolerance is also taken into consideration, the peak position of the upstream magnetic pole (scooping magnetic pole S1) disposed upstream of the regulating magnetic pole N1 may preferably be disposed 2° or more upstream of the half-value center position of the upstream magnetic pole (scooping magnetic pole S1), more preferably 3° or more, further preferably 4° or more.

In the embodiment 2, a magnitude of the magnetic attraction force Fr is smaller than that in the comparison example 3 on the side upstream of the regulating magnetic pole N1. This is because the embodiment 2 and the comparison example 3 are different from each other in magnetic flux density distribution of the regulating magnetic pole N1.

That is, in both the embodiment 2 and the comparison example 3, the magnetic flux density distribution of the regulating magnetic pole N1 has the two-peak shape. However, in the embodiment 2, the absolute value B1 of the magnetic flux density of the upstream peak P1 in the normal direction is smaller than the absolute value B2 of the magnetic flux density of the downstream peak P2 in the normal direction (requirement (C)). On the other hand, in the comparison example 3, B1 is larger than B2.

Specifically, in the comparison example 3, the absolute value |Br| of the magnetic flux density of the regulating magnetic pole N1 is 47 mT at the upstream position P1 and is 44 mT at the downstream peak P2, so that the downstream peak P2 is smaller in absolute value |Br| than the upstream peak P1. On the other hand, in the embodiment 2, the absolute value |Br| of the magnetic flux density of the regulating magnetic pole is 44 mT at the upstream peak P1 and is 44 mT at the downstream peak P2, so that the downstream peak P2 is larger in absolute value |Br| than the upstream peak P1. For that reason, in the embodiment 2, the change in magnetic flux density Br on the side upstream of the regulating magnetic pole N1 is liable to become moderate.

Further, in the embodiment 2, combined with the asymmetrical shape of the magnetic pole (scooping magnetic pole S1) upstream of the regulating magnetic pole N1 such that the peak shifts toward the upstream side, the change in magnetic flux density Br on the side upstream of the regulating magnetic pole N1 can be made more moderate. As a result, on the side upstream of the regulating magnetic pole N1, the magnetic attraction force Fr can be made smaller than the magnetic attraction force Fr in the comparison example 3.

As regards the asymmetry of the magnetic flux density Br in the embodiment 2, the peak position of the upstream magnetic pole (contact magnetic pole S1) disposed upstream of the regulating magnetic pole is disposed 2° upstream of the half-value center position of the upstream magnetic pole (scooping magnetic pole S1). Incidentally, in the comparison example 2, the peak position is disposed 4° upstream of the half-value center position. For this reason, in the embodiment 2, an amount in which the peak position shifts toward the upstream side is smaller than the amount in the comparison example 3. Thus, in the embodiment 2, although the shift amount of the peak position toward the upstream side is small, by satisfying the above-described requirement (C), the magnitude of the magnetic attraction force Fr can be made smaller than in the comparison example 3 on the side upstream of the regulating magnetic pole N1. This would be considered because the embodiment 2 is different from the comparison example 3 and the absolute value |Br| of the magnetic flux density of the regulating magnetic pole N1 is capable of making the upstream peak P1 smaller than the downstream peak P2, and therefore, even when the asymmetry is somewhat small, an effect which is equal to or more than the effect of the comparison example 3 is obtained.

As described above, as regards the peak position of the upstream magnetic pole (scooping magnetic pole S1), when the part tolerance is taken into consideration, the peak position may preferably be disposed upstream of the half-value center position by 2°. Further, as regards a difference between the upstream peak P1 and the downstream peak P2, for the same reason as the reason described in the embodiment 1, the difference may preferably be suppressed to 2 mT or more and 10 mT or less.

In the case of this embodiment described above, by employing the constitution as described above, even in the magnetic flux density distribution in which the regulating magnetic pole N1 disposed closest to the regulating member the developer deterioration can be suppressed.

OTHER EMBODIMENTS

In the above-described embodiments, the case where the present invention is applied to the developing device for use in the image forming apparatus of the tandem type was described. However, the present invention is also applicable to the developing device for use in the image forming apparatus of another type. Further, the image forming apparatus is not limited to the image forming apparatus for a full-color image, but may also be an image forming apparatus for a monochromatic image or an image forming apparatus for a mono-color (single color) image. Or, the image forming apparatus can be carried out in various uses, such as printers, various printing machines, copying machines, facsimile machines and multi-function machines by adding necessary devices, equipment and casing structures or the like.

Further, also as regards the structure of the developing device, as described above, the structure is not limited to a structure in which the developing chamber and the stirring chamber are disposed in the horizontal direction, but may also be a structure in which the developing chamber and the stirring chamber are disposed in a vertical direction or a structure in which the developing chamber and the stirring chamber are disposed in a direction inclined with respect to the horizontal direction. Further, in FIG. 2, the developer is supplied from the developing chamber to the developing sleeve and is collected from the developing sleeve in the developing chamber, but a constitution in which the developer is supplied from the developing chamber to the developing sleeve and is collected from the developing sleeve in the stirring chamber may also be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-102398 filed on Jun. 21, 2021, which is hereby incorporated by reference herein in its entirety.

What is claimed is:

1. A developing device comprising:

a developing container configured to contain a developer containing toner and a carrier;

a rotatable developing member configured to carry and feed the developer to a developing position;

a magnet provided non rotatably and stationarily inside said rotatable developing member and provided with a regulating pole; and a regulating portion configured to regulate an amount of the developer carried on said rotatable developing member by a magnetic force of the regulating pole, wherein with respect to a rotational direction of said rotatable developing member, a local minimum position, where a magnetic flux density of the regulating pole in a normal direction relative to an outer peripheral surface of said rotatable developing member is a local minimum value, is downstream of a first local maximum position where the magnetic flux density of the regulating pole in the normal direction relative to the outer peripheral surface of said rotatable developing member is a first local maximum value, and is upstream of a second local maximum position where the magnetic flux density of the regulating pole in the normal direction relative to the outer peripheral surface of said rotatable developing member is a second local maximum value, wherein with respect to the rotational direction of said rotatable developing member, an angle between the first local maximum position and the second local maximum position is 20° or more and less than 50°, wherein with respect to the rotational direction of said rotatable developing member, a closest position on the outer peripheral surface of said rotatable developing member where said rotatable developing member is closest to said regulating portion is downstream of the first local maximum position and is upstream of the second local maximum position, and wherein with respect to the rotational direction of said rotatable developing member, an angle from the second local maximum position to a position, where the magnetic flux density of the regulating pole in the normal relative to the outer peripheral surface of said rotatable developing member is a half value of the second local maximum value on a side downstream of the second local maximum position, is smaller than an angle from a position where the magnetic flux density of the regulating pole in the normal direction relative to the outer peripheral surface of said rotatable developing member is a half value of the first local maximum value on a side upstream of the first local maximum position to the first local maximum position.

2. A developing device according to claim 1, wherein with respect to the rotational direction of said rotatable developing member, the angle from the position where the magnetic flux density of the regulating pole in the normal direction relative to the outer peripheral surface of said rotatable developing member is the half value of the first local maximum value on the side upstream of the first local maximum position to the first local maximum position is 13° or more and less than 50°.

3. A developing device according to claim 1, wherein said magnet further includes an upstream side magnetic pole provided adjacent to the regulating pole on a side upstream of the regulating pole with respect to the rotational direction of said rotatable developing member and a downstream side magnetic pole provided adjacent to the regulating pole on a side downstream of the regulating pole with respect to the rotational direction of said rotatable developing member, and wherein with respect to the rotational direction of said rotatable developing member, an angle from the second local maximum position to a position, where a magnetic flux density of the downstream side magnetic pole in the normal direction relative to the outer peripheral surface of said rotatable developing member is a local maximum value, is smaller than an angle from a position where a magnetic flux density of the upstream side magnetic pole in the normal direction relative to the outer peripheral surface of said rotatable developing member is a local maximum value to the first local maximum position.

4. A developing device according to claim 1, wherein an absolute value of a difference between an absolute value of the first local maximum value and an absolute value of the local minimum value is 10 mT or less.

5. A developing device according to claim 1, wherein an absolute value of a difference between an absolute value of the first local maximum value and an absolute value of the second local maximum value is 2 mT or more and 10 mT or less.

6. A developing device according to claim 1, wherein said magnet further includes an upstream side magnetic pole provided adjacent to the regulating pole on a side upstream of the regulating pole with respect to the rotational direction of said rotatable developing member, and wherein with respect to the rotational direction of said rotatable developing member, a position, where a magnetic flux density of the upstream side magnetic pole in the normal direction relative to the outer peripheral surface of said rotatable developing member is a local maximum value, is upstream of a half value center position of the magnetic flux density of the upstream side magnetic pole in the normal direction relative to the outer peripheral surface of said rotatable developing member.

7. A developing device according to claim 1, wherein with respect to the rotational direction of said rotatable developing member, the closest position on the outer peripheral surface of said rotatable developing member where said rotatable developing member is closest to said regulating portion is upstream of the local minimum position.

8. A developing device comprising:

a developing container configured to contain a developer containing toner and a carrier;

a rotatable developing member configured to carry and feed the developer to a developing position;

a magnet provided non rotatably and stationarily inside said rotatable developing member and provided with a regulating pole; and a regulating portion configured to regulate an amount of the developer carried on said rotatable developing member by a magnetic force of the regulating pole, wherein with respect to a rotational direction of said rotatable developing member, a local minimum position, where a magnetic flux density of the regulating pole in a normal direction relative to an outer peripheral surface of said rotatable developing member is a local minimum value, is downstream of a first local maximum position where the magnetic flux density of the regulating pole in the normal direction relative to the outer peripheral surface of said rotatable developing member is a first local maximum value, and is upstream of a second local maximum position where the magnetic flux density of the regulating pole in the normal direction relative to the outer peripheral surface of said rotatable developing member is a second local maximum value, wherein with respect to the rotational direction of said rotatable developing member, an angle between the first local maximum position and the second local maximum position is 20° or more and less than 50°, wherein with respect to the rotational direction of said rotatable developing member, a closest position on the outer peripheral surface of said rotatable developing member where said rotatable developing member is closest to said regulating portion is downstream of the first local maximum position and is upstream of the second local maximum position, and wherein the following relationship is satisfied:

$$B1/\theta1<B2/\theta2,$$

where B1 represents an absolute value of the first local maximum value, B2 represents an absolute value of the second local maximum value, θ1 represents an angle from a position where the magnetic flux density of the regulating pole in the normal direction relative to the outer peripheral surface of said rotatable developing member is a half value of the first local maximum value on a side upstream of the first local maximum position to the first local maximum position with respect to the rotational direction of said rotatable developing member, and θ2 represents an angle from the second local maximum position to a position where the magnetic flux density of the regulating pole in the normal direction relative to the outer peripheral surface of said rotatable developing member is a half value of the second local maximum value on a side downstream of the second local maximum position with respect to the rotational direction of the rotatable developing member.

9. A developing device according to claim 8, wherein θ1 satisfies the following relationship:

$$13°\leq\theta1<50°.$$

10. A developing device according to claim 8, wherein said magnet further includes an upstream side magnetic pole provided adjacent the regulating pole on a side upstream of the regulating pole with respect to the rotational direction of said rotatable developing member and a downstream side magnetic pole provided adjacent to the regulating pole on a side downstream of the regulating pole with respect to the rotational direction of said rotatable developing member, and wherein with respect to the rotational direction of said rotatable developing member, an angle from the second local maximum position to a position, where a magnetic flux density of the downstream side magnetic pole in the normal direction relative to the outer peripheral surface of said rotatable developing member is a local maximum value, is smaller than an angle from a position where a magnetic flux density of the upstream side magnetic pole in the normal direction relative to the outer peripheral surface of said rotatable developing member is a local maximum value to the first local maximum position.

11. A developing device according to claim 8, wherein an absolute value of a difference between an absolute value of the first local maximum value and an absolute value of the local minimum value is 10 mT or less.

12. A developing device according to claim 8, wherein an absolute value of a difference between an absolute value of the first local maximum value and an absolute value of the second local maximum value is 2 mT or more and 10 mT or less.

13. A developing device according to claim 8, wherein said magnet further includes an upstream side magnetic pole provided adjacent to the regulating pole on a side upstream of the regulating pole with respect to the rotational direction of said rotatable developing member, and wherein with respect to the rotational direction of said rotatable developing member, a position, where a magnetic flux density of the upstream side magnetic pole in the normal direction relative to the outer peripheral surface of said rotatable developing member is a local maximum value, is upstream of a half value center position of the magnetic flux density of the upstream side magnetic pole in the normal direction relative to the outer peripheral surface of said rotatable developing member.

14. A developing device according to claim 8, wherein with respect to the rotational direction of said rotatable developing member, the closest position on the outer peripheral surface of said rotatable developing member where said rotatable developing member is closest to said regulating portion is upstream of the local minimum position.

15. A developing device comprising:

a developing container configured to contain a developer containing toner and a carrier;

a rotatable developing member configured to carry and feed the developer to a developing position;

a magnet provided non rotatably and stationarily inside said rotatable developing member and provided with a regulating pole, an upstream side magnetic pole provided adjacent to the regulating pole on a side upstream of the regulating pole with respect to a rotational direction of said rotatable developing member, and a downstream side magnetic pole provided adjacent to the regulating pole on a side downstream of the regulating pole with respect to the rotational direction of said rotatable developing member; and a regulating portion configured to regulate an amount of the developer carried on said rotatable developing member by a magnetic force of the regulating pole, wherein with respect to the rotational direction of said rotatable developing member, a local minimum position, where a magnetic flux density of the regulating pole in a normal direction relative to an outer peripheral surface of said rotatable developing member is a local minimum value, is downstream of a first local maximum position where the magnetic flux density of the regulating pole in the normal direction relative to the outer peripheral surface of said rotatable developing member is a first local maximum value, and is upstream of a second local maximum position where the magnetic flux density of the regulating pole in the normal direction relative to the outer peripheral surface of said rotatable developing member is a second local maximum value, wherein with respect to the rotational direction of said rotatable developing member, an angle between the first local maximum position and the second local maximum position is 20° or more and less than 50°, wherein with respect to the rotational direction of said rotatable developing member, a closest position on the outer peripheral surface of said rotatable developing member where said rotatable developing member is closest to said regulating portion is downstream of the first local maximum position and is upstream of the second local maximum position, and wherein with respect to the rotational direction of said rotatable developing member, an angle from the second local maximum position to a position, where the magnetic flux density of the downstream side magnetic pole in the normal relative to the outer peripheral surface of said rotatable developing member is a local maximum value, is smaller than an angle from a position where the magnetic flux density of the upstream side magnetic pole in the normal direction relative to the outer peripheral surface of said rotatable developing member is a local maximum value to the first local maximum value.

16. A developing device according to claim 15, wherein an absolute value of a difference between an absolute value of the first local maximum value and an absolute value of the local minimum value is 10 mT or less.

17. A developing device according to claim 15, wherein an absolute value of a difference between an absolute value of the first local maximum value and an absolute value of the second local maximum value is 2 mT or more and 10 mT or less.

18. A developing device according to claim 15, wherein with respect to the rotational direction of said rotatable developing member, a position, where a magnetic flux density of the upstream side magnetic pole in the normal direction relative to the outer peripheral surface of said rotatable developing member is a local maximum value, is upstream of a half value center position of the magnetic flux density of the upstream side magnetic pole in the normal direction relative to the outer peripheral surface of said rotatable developing member.

19. A developing device according to claim 15, wherein with respect to the rotational direction of said rotatable developing member, the closest position on the outer peripheral surface of said rotatable developing member where said rotatable developing member is closest to said regulating portion is upstream of the local minimum position.

* * * * *